US010858540B2

(12) United States Patent
Audenaert et al.

(10) Patent No.: US 10,858,540 B2
(45) Date of Patent: Dec. 8, 2020

(54) COMPOSITION INCLUDING SILANES AND METHODS OF MAKING A TREATED ARTICLE

(71) Applicant: 3M INNOVATIVE PROPERTIES COMPANY, St. Paul, MN (US)

(72) Inventors: Frans A. Audenaert, Kaprijke (BE); Christoph T. R. Schuell, Neuss (DE); Inge Nuyts, Steendorp (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/762,350

(22) PCT Filed: Sep. 21, 2016

(86) PCT No.: PCT/US2016/052756
§ 371 (c)(1),
(2) Date: Mar. 22, 2018

(87) PCT Pub. No.: WO2017/053345
PCT Pub. Date: Mar. 30, 2017

(65) Prior Publication Data
US 2018/0282578 A1    Oct. 4, 2018

Related U.S. Application Data

(60) Provisional application No. 62/222,313, filed on Sep. 23, 2015.

(51) Int. Cl.
| C09D 183/08 | (2006.01) |
| B05D 5/08 | (2006.01) |
| B05D 7/14 | (2006.01) |
| C08L 83/08 | (2006.01) |
| B05D 1/18 | (2006.01) |
| C08G 77/24 | (2006.01) |
| C08G 77/26 | (2006.01) |

(52) U.S. Cl.
CPC .......... C09D 183/08 (2013.01); B05D 5/086 (2013.01); B05D 7/14 (2013.01); C08L 83/08 (2013.01); B05D 1/18 (2013.01); B05D 2401/10 (2013.01); B05D 2506/10 (2013.01); B05D 2518/10 (2013.01); C08G 77/24 (2013.01); C08G 77/26 (2013.01); C23C 2222/20 (2013.01)

(58) Field of Classification Search
CPC ........ C09D 183/08; B05D 5/086; B05D 7/14; B05D 1/18; B05D 2401/10; B05D 2506/10; B05D 2518/10; C08L 83/08; C08G 77/24; C08G 77/26; C23C 2222/20
USPC ........................................ 427/384
See application file for complete search history.

(56) References Cited

U.S. PATENT DOCUMENTS

| 3,250,807 A | 5/1966 | Fritz |
| 3,250,808 A | 5/1966 | Moore |
| 3,646,085 A | 2/1972 | Bartlett |
| 3,810,874 A | 5/1974 | Mitsch |
| 4,647,413 A | 3/1987 | Savu |
| 5,274,159 A | 12/1993 | Pellerite |
| 5,578,278 A | 11/1996 | Fall |
| 5,658,962 A | 8/1997 | Moore |
| 6,200,684 B1 | 3/2001 | Yamaguchi |
| 6,277,485 B1 | 8/2001 | Invie |
| 6,592,659 B1 | 7/2003 | Terrazas |
| 6,613,860 B1 | 9/2003 | Dams |
| 6,656,258 B2 | 12/2003 | Elsbernd |
| 6,716,534 B2 | 4/2004 | Moore |
| 7,294,731 B1 | 11/2007 | Flynn |
| 7,338,996 B2 | 3/2008 | Fehn |

(Continued)

FOREIGN PATENT DOCUMENTS

| EP | 2463325 | 6/2012 |
| WO | WO 1999-37720 | 7/1999 |

(Continued)

OTHER PUBLICATIONS

Dietliker, "Chemistry & Technology of UV & EB Formulation for Coatings, Inks & Paints", Photoinitiators for Free Radical and Cationic Polymerisation, 1991, vol. 03, pp. 274-298.
Hoyt, "Plolysiloxane Networks with Hydrogen Bonding Pendant Moieties", Proceedings of the 24th Annual Meeting of the Adhesion Society, Feb. 25-28, 2001, pp. 474-476.
Petrie, "Silanes as Primers and Adhesion Promoters for Metal Substrates", metalfinishing, Jul./Aug. 2007, pp. 85-93.
Silane Coupling Agents Connecting Across Boundaries, Gelest, Inc., 2006, 60 pages.
International Search Report for PCT International Application No. PCT/US2016/052756, dated Dec. 2, 2016, 4 pages.

* cited by examiner

Primary Examiner — Ronald Grinsted
(74) Attorney, Agent, or Firm — Kathleen B. Gross

(57) ABSTRACT

A composition that includes an amino-functional compound having at least one silane group, a fluorinated compound represented by formula $Rf\{-X-[Si(Y)_{3-x}(R)_x]_y\}_z$, and a non-fluorinated organic solvent having a flashpoint of at least 40° C. A method of making a treated article having a metal surface using a composition that includes an amino-functional compound having at least one silane group, a fluorinated compound represented by formula $Rf\{-X-[Si(Y)_{3-x}(R)_x]_y\}_z$, and an organic solvent having a flashpoint of at least 40° C. is also disclosed. Another method includes treating the metal surface with a primer composition including an amino-functional compound having at least one silane group to provide a primed metal surface and subsequently treating the primed metal surface with a treatment composition including a fluorinated compound represented by formula $Rf\{-X-[Si(Y)_{3-x}(R)_x]_y\}_z$. The compositions each include up to one percent by weight of an organic solvent having a flashpoint up to 40° C.

20 Claims, No Drawings

(56) References Cited

U.S. PATENT DOCUMENTS

| | | |
|---|---|---|
| 7,470,741 B2 | 12/2008 | Dams |
| 7,652,115 B2 | 1/2010 | Dams |
| 7,803,894 B2 | 9/2010 | Dams |
| 8,137,452 B2 | 3/2012 | Posset |
| 8,158,264 B2 | 4/2012 | David |
| 9,175,170 B2 | 11/2015 | Domes |
| 9,388,315 B2 | 7/2016 | Hoshino |
| 2007/0054056 A1 | 3/2007 | Albert et al. |
| 2008/0220264 A1 | 9/2008 | Iyer |
| 2011/0195260 A1 | 8/2011 | Lee et al. |
| 2011/0281121 A1 | 11/2011 | He |
| 2013/0146100 A1 | 6/2013 | Saito |
| 2013/0220177 A1* | 8/2013 | Iyer ............... C09D 4/00 106/287.14 |
| 2017/0081523 A1 | 3/2017 | Audenaert |
| 2017/0152396 A1 | 6/2017 | Jinks |

FOREIGN PATENT DOCUMENTS

| | | |
|---|---|---|
| WO | WO 2003-018213 | 3/2003 |
| WO | WO 2003-040247 | 5/2003 |
| WO | WO 2006-079543 | 8/2006 |
| WO | WO 2007-073756 | 7/2007 |
| WO | WO 2007-077136 | 7/2007 |
| WO | WO 2010-060006 | 5/2010 |
| WO | WO 2011-146306 | 11/2011 |
| WO | WO 2013-115191 | 8/2013 |
| WO | WO 2014-011771 | 1/2014 |

COMPOSITION INCLUDING SILANES AND METHODS OF MAKING A TREATED ARTICLE

CROSS-REFERENCE TO RELATED APPLICATION

This application is a national stage filing under 35 U.S.C. 371 of PCT/US2016/052756, filed Sep. 21, 2016, which claims priority to U.S. Provisional Application No. 62/222,313, filed Sep. 23, 2015, the disclosure of which is incorporated by reference in its entirety herein.

BACKGROUND

Various techniques have been used to impart repellent properties to a substrate. For example, silane compounds or compositions having one or more fluorinated groups have been successfully used for rendering substrates such as glass and ceramics oil- and water-repellent. Such silane compounds or compositions have typically included one or more hydrolysable groups and at least one fluorinated alkyl group or fluorinated polyether group. See, for example, U.S. Pat. No. 3,646,085 (Bartlett); U.S. Pat. No. 5,274,159 (Pellerite et al.); U.S. Pat. No. 6,613,860 (Dams et al.); U.S. Pat. No. 6,716,534 (Moore et al.), U.S. Pat. No. 7,470,741 (Dams); and U.S. Pat. No. 7,652,115 (Dams et al.) and Int. Pat. Appl. Pub. No. WO2010/060006 (Hao et al.). Substrates that have been treated for oil and water repellency include glass, ceramics such as bathroom tiles, enamel, metals, natural and man-made stone, polymers, and wood.

Some surface modification techniques have been successfully used with metal surfaces (see, e.g., U.S. Pat. No. 8,158,264 (David et al.)), but some of these techniques are expensive and time-consuming and may be difficult to carry out on larger metal or metallized articles.

SUMMARY

While certain fluorinated silanes adhere well to glass and ceramics and provide a highly durable easy-to-clean coating to these substrates, typically these fluorinated silanes have not been as successful for treating metal surfaces. There continues to be a need for methods for imparting repellent properties to metal surfaces and for articles with metal surfaces having durable oil and water repellency.

Metal surfaces are found on a variety of commonly used articles in the home, in vehicles, and outdoors. For example, metal surfaces are popular in kitchens and bathrooms and are used for faucets, shower heads, hand rails, range hoods, and other appliances. In another example, in automobiles, metal surfaces are used for exterior parts such as wheel rims and for interior handles or decorative panels. Such metal surfaces can come in contact with a variety of oily and aqueous deposits such as cooking or automotive oil or grease, food, soap, dirt, sand, and minerals (e.g., lime). These deposits, which may be in the form of fingerprints, stains, or smudges, tend to show up easily on the surface and can be difficult to remove. Removing these deposits often requires aggressive scrubbing, frequently with cleaners or detergents, which may challenge the esthetic appearance of the surface. Easy-to-clean metal surfaces that allow removal of oily and aqueous deposits without the need for aggressive scrubbing and that retain this property after repeated cleaning would, therefore, be advantageous. A method that can achieve this and articles made therefrom have now been found.

The art describes low-molecular-weight organic solvents as useful for dissolving polyfluoropolyether silanes (see, e.g. U.S. Pat. No. 3,646,085 (Barlett), U.S. Pat. No. 6,613,860 (Dams et al.) U.S. Pat. No. 6,716,534 (Moore et al.), and U.S. Pat. No. 7,470,741 (Dams)). These solvents include aliphatic alcohols such as methanol, ethanol, 2-propanol (isopropyl alcohol); ketones such as acetone or methyl ethyl ketone (MEK); esters such as ethyl acetate, methyl formate, and ethers such as diisopropyl ether. Sometimes fluorinated solvents have been used to improve the solubility. Unfortunately these low-molecular-weight organic solvents are highly flammable (e.g., having a flashpoint lower than 23° C.).

Higher molecular weight solvents have higher flashpoints, but they are generally not recommended for polyfluoropolyether silanes, because of their low solubilizing character. We have now surprisingly found that formulations of polyfluoropolyether silanes can be prepared in several higher molecular weight, high-flashpoint solvents, giving excellent easy-clean performance on metal substrates, when combined with amino-functional silanes.

In one aspect, the present disclosure provides a composition that includes an amino-functional compound having at least one silane group, a fluorinated compound represented by formula $Rf\{-X-[Si(Y)_{3-x}(R)_x]_y\}_z$, and a non-fluorinated organic solvent having a flashpoint of at least 40° C. In this formula, Rf is a polyfluoropolyether group; X is a divalent or trivalent organic linking group; each Y is independently halogen, alkoxy, hydroxyl, acyloxy, polyalkyleneoxy, or aryloxy; R is an alkyl group having up to 8 carbon atoms or a phenyl group; x is 0 or 1 or 2; y is a value from 1 to 8; and z is 1 or 2. The composition includes only up to one percent by weight of an organic solvent having a flashpoint up to 40° C.

In another aspect, the present disclosure provides a method of making a treated article having a metal surface. The method includes treating the metal surface with a composition including an amino-functional compound having at least one silane group, a fluorinated compound represented by formula $Rf\{-X-[Si(Y)_{3-x}(R)_x]_y\}_z$, and an organic solvent having a flashpoint greater than 40° C. In this formula, Rf is a polyfluoropolyether group; X is a divalent or trivalent organic linking group; each Y is independently halogen, alkoxy, hydroxyl, acyloxy, polyalkyleneoxy, or aryloxy; R is an alkyl group having up to 8 carbon atoms or a phenyl group; x is 0 or 1 or 2; y is a value from 1 to 8; and z is 1 or 2. The composition includes only up to one percent by weight of an organic solvent, which is fluorinated or non-fluorinated, having a flashpoint up to 40° C.

In another aspect, the present disclosure provides a method of making a treated article having a metal surface. The method treating the metal surface with a primer composition that includes an amino-functional compound having at least one silane group to provide a primed metal surface and subsequently treating the primed metal surface with a treatment composition that includes a fluorinated compound represented by formula $Rf\{-X-[Si(Y)_{3-x}(R^1)_x]_y\}_z$. In this formula, Rf is a polyfluoropolyether group; X is a divalent or trivalent organic linking group; each Y is independently halogen, alkoxy, hydroxyl, acyloxy, polyalkyleneoxy, or aryloxy; $R^1$ is an alkyl group having up to 8 carbon atoms or a phenyl group; x is 0 or 1 or 2; y is 1 or 2; and z is 1 or 2. Each of the primer composition and the treatment composition independently includes an organic solvent, which is fluorinated or non-fluorinated, having a flashpoint greater than 40° C. and includes only up to one percent by weight of an organic solvent having a flashpoint up to 40° C.

In any of the aforementioned aspects, the concentration of the fluorinated compound in the composition is typically low enough so that insoluble fractions are not present in the composition.

In some embodiments of the aforementioned composition or methods, the fluorinated compound is represented by formula $Rf\{Q\text{-}X'\text{—}[Si(Y)_{3-x}(R)_x]_y\}_z$, in which Q is a bond, —C(O)—N(R')—, —C(O)—O—, or —SO$_2$N(R')—, where R' is hydrogen or alkyl having up to 4 carbon atoms; X' is a divalent or trivalent organic linking group including at least one of alkylene or arylalkylene, each of which is optionally interrupted by at least one functional group that is independently ether, thioether, sulfone, amine, ester, amide, carbamate, or urea, and Rf, Y, Y', R, x, y, and z are as defined above. In some embodiments, the fluorinated compound is represented by formula $Rf\{C(O)NR'\text{—}X''\text{—}[Si(Y)_{3-x}(R)_x]_y\}_z$. In this formula, X" is a divalent or trivalent organic linking group including at least one of alkylene or arylalkylene, each of which is optionally interrupted by at least one carbamate or urea, and Rf, Y, Y', R, x, y, and z are as defined above.

In some embodiments of the aforementioned composition or methods, the amino-functional compound is represented by formula $(R^3)_2N\text{—}R^1\text{—}[Si(Y^2)_p(R^2)_{3-p}]_q$, in which $R^1$ is a multivalent alkylene group optionally interrupted by one or more —O— groups or up to three $NR^3$— groups; $R^2$ is alkyl or arylalkylenyl; each $R^3$ is independently hydrogen, alkyl, arylalkylenyl, or —$R^1$—$[Si(Y^2)_p(R^2)_{3-p}]$; $Y^2$ is alkoxy, acyloxy, aryloxy, hydroxyl, polyalkyleneoxy, or halogen; p is 1, 2, or 3; and q is 1, 2, or 3. In some embodiments, at least two independently selected —$Si(Y^2)_p(R^2)_{3-p}$ groups are present. In some embodiments, both $R^3$ groups are not hydrogen, and the amino-functional compound has a secondary or tertiary amino group. In some embodiments, q is 1.

As used herein, the terms "alkyl" and the prefix "alk" are inclusive of both straight chain and branched chain groups and of cyclic groups, e.g., cycloalkyl. Unless otherwise specified, these groups contain from 1 to 20 carbon atoms. In some embodiments, these groups have a total of up to 10 carbon atoms, up to 8 carbon atoms, up to 6 carbon atoms, or up to 4 carbon atoms. Cyclic groups can be monocyclic or polycyclic and preferably have from 3 to 10 ring carbon atoms.

The term "alkylene" is the divalent or trivalent form of the "alkyl" groups defined above.

Unless otherwise indicated, the term "halogen" refers to a halogen atom or one or more halogen atoms, including chlorine, bromine, iodine, and fluorine atoms.

The term "aryl" as used herein includes carbocyclic aromatic rings or ring systems optionally containing at least one heteroatom (i.e., O, N, or S). Examples of aryl groups include phenyl, naphthyl, biphenyl, and pyridinyl.

The term "arylene" is the divalent form of the "aryl" groups defined above.

"Arylalkylene" refers to an "alkylene" moiety to which an aryl group is attached.

"Arylalkylenyl" refers to a terminal aryl group attached an "alkylene" moiety.

The term "carbamate" refers to the group —O—C(O)—N(R')— wherein R' is as defined below.

The term "urea" refers to the group —N(R')—C(O)—N(R')— wherein each R' is independently as defined below.

The term "hydrolysable group" refers to a group which either is directly capable of undergoing condensation reactions under appropriate conditions or which is capable of hydrolyzing under appropriate conditions to yield a compound that is capable of undergoing condensation reactions. Appropriate conditions typically refers to the presence of water and optionally the presence of acid or base.

The term "non-hydrolysable group" refers to a group generally not capable of hydrolyzing under the appropriate conditions described above for hydrolyzing hydrolysable groups, (e.g., acidic or basic aqueous conditions).

As used herein, "a," "an," "the," "at least one," and "one or more" are used interchangeably.

The phrases "at least one of" and "comprises at least one of" followed by a list refers to any one of the items in the list and any combination of two or more items in the list.

Also herein, the recitations of numerical ranges by endpoints include all numbers subsumed within that range, including the endpoints (e.g., 1 to 5 includes 1, 1.5, 2, 2.75, 3, 3.80, 4, 5, etc.). When the number is an integer, then only the whole numbers are included (e.g., 1, 2, 3, 4, 5, etc.).

The above summary is not intended to describe each disclosed embodiment or every implementation of the present disclosure. The description that follows more particularly exemplifies illustrative embodiments. In several places throughout the application, guidance is provided through lists of examples, which examples can be used individually and in various combinations. In each instance, the recited list serves only as a representative group and should not be interpreted as an exclusive list.

DETAILED DESCRIPTION

Compositions according to the present disclosure and/or methods of using such compositions include an amino-functional compound having at least one silane group. The amino-functional compound useful for practicing any of these embodiments has at least one independently selected silane group $Si(Y^2)_p(R^2)_{3-p}$, wherein $Y^2$ is a hydrolysable group such as those described below in connection with formulas I and II or a hydroxyl group, $R^2$ is a non-hydrolysable group such as alkyl or arylalkylenyl, either of which may be substituted, and p is 1, 2, or 3. In the amino-functional compound, the amino group is typically bonded to a carbon atom. The amino-functional compound may have one, two, three, or four amino groups. The silane groups are independently selected, which means that two or more silane groups in the amino-functional compound may be the same or different. When two or more silane groups are independently selected, it should be understood that the $Y^2$ and $R^2$ groups and the number of $Y^2$ groups may be independently selected.

In some embodiments, the amino-functional compound useful for practicing the present disclosure is represented by formula I: $(R^3)_2N\text{—}R^1\text{—}[Si(Y^2)_p(R^2)_{3-p}]_q$. In formulas I, $R^1$ is a multivalent alkylene group optionally interrupted by one or more —O— groups or up to three —$NR^3$— groups. In some embodiments, $R^1$ is interrupted by up to three —O— groups. In embodiments in which $R^1$ is interrupted by up to three —$NR^3$— groups, the amino-functional compound includes diamino-functional silanes, triamino-functional silanes, and tetraamino-functional silanes, for example. In some embodiments, $R^1$ is a divalent alkylene group. In some embodiments, $R^1$ is a divalent alkylene group having up to 6 (in some embodiments, 5, 4, or 3) carbon atoms. In some embodiments, $R^1$ is a divalent alkylene group interrupted by one or two —$NR^3$— groups and is represented by formula —CH$_2$—CH$_2$—N(R$^3$)—CH$_2$—CH$_2$—CH$_2$— or —CH$_2$—CH$_2$—N(R$^3$)—CH$_2$—CH$_2$—N(R$^3$)—CH$_2$—CH$_2$—CH$_2$—.

In formula I, $R^2$ is alkyl or arylalkylenyl. In some of these embodiments, $R^2$ is alkyl (e.g., methyl or ethyl).

In formula I, each $R^3$ is independently hydrogen, alkyl, arylalkylenyl, or —$R^1$—[Si($Y^2$)$_p$($R^2$)$_{3-p}$], where $R^1$ is defined as in any of the above embodiments. In some embodiments, both $R^3$ groups are hydrogen, and the amino-functional silane is a primary amino-functional silane. In some embodiments, both $R^3$ groups may not be hydrogen, and the amino-functional silane is a secondary or tertiary amino-functional silane. In some embodiments, one $R^3$ group is hydrogen or alkyl, and the other $R^3$ group is —$R^1$—[Si(Y)$_p$($R^2$)$_{3-p}$]. In some of these embodiments, one $R^3$ group is alkyl, and the other $R^3$ group is —$R^1$—[Si(Y)$_p$($R^2$)$_{3-p}$]. In some of these embodiments, alkyl may have up to 6 (in some embodiments, up to 5, 4, 3, or 2) carbon atoms. In some embodiments, one $R^3$ group is hydrogen or methyl, and the other $R^3$ group is —$R^1$—[Si(Y)$_p$($R^2$)$_{3-p}$]. In some of these embodiments, one $R^3$ group is hydrogen, and the other $R^3$ group is —$R^1$—[Si(Y)$_p$($R^2$)$_{3-p}$].

In some embodiments, only one —Si(Y)$_p$($R^2$)$_{3-p}$ group is present in the compound represented by formula I. In some embodiments, $R^1$ and $R^3$ are selected such that at least two independently selected —Si(Y)$_p$($R^2$)$_{3-p}$ groups are present in the compound represented by formula I.

In formula I, $Y^2$ is alkoxy, acyloxy, aryloxy, hydroxyl, polyalkyleneoxy, or halogen. In some embodiments, including any of the embodiments described above for $R^1$, $R^2$, or $R^3$, $Y^2$ is alkoxy, acetoxy, aryloxy, or halogen. In some embodiments, including any of the embodiments described above for $R^1$, $R^2$, or $R^3$, $Y^2$ is methoxy, acetoxy, phenoxy, bromo, or chloro. In some embodiments, including any of the embodiments described above for $R^1$, $R^2$, or $R^3$, $Y^2$ is methoxy, acetoxy, or chloro. Methoxy groups on a silane provide low steric hindrance and are readily hydrolyzed to effectively allow for formation of an —Si—O—Si— bond. Acetoxy and chloro groups on a silane are also readily hydrolyzed for at least the same reason and therefore are expected to be as effective or even more effective than methoxy groups in allowing formation of an —Si—O—Si— bond.

In formula I, p is 1, 2, or 3. In some embodiments, including any of the embodiments described above for $R^1$, $R^2$, $R^3$, or $Y^2$, p is 3.

In formula I, q is 1, 2, or 3. In some embodiments of formula I, q is 1. It should be understood that when q is 1, the compound of formula I can be written as formula II: $(R^3)_2N$—$R^1$—[Si($Y^2$)$_p$($R^2$)$_{3-p}$]. In these embodiments, $R^1$ is a divalent alkylene group. In some embodiments of formula I, $R^1$ is a multivalent alkylene group, and q is 2 or 3.

Examples of amino-functional compounds useful for practicing the present disclosure include 3-(aminopropyl)trimethoxysilane and 3-(aminopropyl)triethoxysilane, bis(3-trimethoxysilylpropyl)amine, bis(3-triethoxysilylpropyl)amine, N-methyl-bis(3-trimethoxysilylpropyl)amine, and N,N'-bis[3-trimethoxysilylpropyl]-ethylenediamine.

Examples of secondary or tertiary amino-functional compounds useful for practicing some embodiments of the present disclosure include bis(3-trimethoxysilylpropyl)amine, bis(3-triethoxysilylpropyl)amine, N-methyl-bis(3-trimethoxysilylpropyl)amine, and N,N'-bis[3-trimethoxysilylpropyl]-ethylenediamine.

In some embodiments of methods for making a treated article according to the present disclosure, the amino-functional compound having at least one silane group (in some embodiments, the secondary or tertiary amino-functional compounds having at least two independently selected silane groups) is used as a primer.

Treatment compositions according to the present disclosure including an amino-functional silane and a fluorinated compound represented by formula Rf{X—[Si(Y)$_{3-x}$(R)$_x$]$_y$}$_z$ have been found to provide more durable easy-to-clean performance than mixtures of the fluorinated compound and other common silanes (e.g., M(Y)$_4$, in which M is Si, Ti, or Zr (e.g., Si); and each Y is independently as defined in any of the embodiments for formula III or IV above (e.g., methoxy or ethoxy)). For example, as shown in the Examples, below, Examples 18 to 21 each provided more durable easy-to-clean performance than Examples C-1 and C-2, which included the same fluorinated compound but tetraethoxysilane instead of an amino-functional silane. In some embodiments of the composition and methods according to the present disclosure, a secondary or tertiary amino-functional silane having at least two independently selected silane groups provides surprisingly more durable easy-to-clean performance when used with a fluorinated silane than other amino-functional silanes such as primary amino-functional silanes having one silane group. For example, in the Examples below, Examples 18 and 20, which included bis(trimethoxysilyl propyl) amine provided better and more durable stain repellency, stain resistance, and stain removal than Examples 19 and 21, which included aminopropyltriethoxysilane.

In some embodiments, compositions according to the present disclosure and/or useful for practicing the methods of the present disclosure are free of any or all of the compounds represented by formula L-$X^2$Si(Y)$_3$, M(Y)$_4$, and (R$^4$)$_g$Si(Y)$_{4-g}$, in which L is an epoxy or mercaptan group; $X^2$ is alkylene (e.g., having up to 8, 6, or 4 carbon atoms) optionally interrupted by at least one ether linkage (e.g., propylene); M is Si, Ti, or Zr (e.g., Si); each Y is independently as defined in any of the embodiments for formula III or IV above (e.g., methoxy or ethoxy); $R^4$ is independently an alkyl group having up to 8 (in some embodiments, up to 6 or 4) carbon atoms or a phenyl group, each of which may be substituted by halogen (i.e., fluoride, chloride, bromide, or iodide), and g is 1 or 2. As shown in the Examples, below, compositions and methods according to the present disclosure effectively provide an easy-to-clean coating in the absence of these compounds.

Typically, fluorinated compounds useful for practicing the present disclosure are represented by formula III:

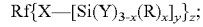    III.

In some embodiments, fluorinated silanes useful in practicing the present disclosure are represented by formula IV:

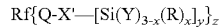    IV.

In formulas III and IV, Rf is a polyfluoropolyether group, containing two or more in-chain oxygen atoms, and which may be monovalent or divalent. Rf may be linear, branched, cyclic, or a combination thereof, and may be saturated or unsaturated. Rf is typically a perfluorinated group (i.e., all C—H bonds are replaced by C—F bonds). However, hydrogen or chlorine atoms may be present instead of fluorine atoms. Typically, not more than one atom of either hydrogen or chlorine is present for every two carbon atoms. In some embodiments, when hydrogen and/or chlorine are present, Rf includes at least one trifluoromethyl group. Compositions of formula III and IV, being oligomeric or polymeric in nature, typically exist as mixtures and are suitable for use as such.

In formula III, each X is independently a divalent or trivalent organic linking group, which includes linear, branched, and cyclic structures. X may be saturated or unsaturated and can contain 1 to 20 (1 to 15, or 1 to 10) carbon atoms and optionally one or more heteroatoms (e.g., O, N, or S). In some embodiments, X contains up to four heteroatoms. The one or more heteroatoms can be combined into functional groups containing more than one heteroatom (e.g., amides, esters, and carbamates). In some embodiments, X contains at least one functional group (e.g., up to 4 functional groups).

In formula IV, Q is a bond, —C(O)—N(R')—, —C(O)—O—, or —SO$_2$N(R')—. In some embodiments, Q is a bond, —C(O)—N(R')—, or —C(O)—O—. In some embodiments, Q is —C(O)—N(R')—. In any of these embodiments, R' is hydrogen or alkyl having up to 4 carbon atoms (i.e., methyl, ethyl, propyl, or butyl). In some embodiments, R' is hydrogen, methyl, or ethyl. In some embodiments, R' is hydrogen or methyl.

In formula IV, X' is an organic linking group comprising at least one of alkylene or arylalkylene. In some embodiments, X' is alkylene. In some embodiments, X' has up to 10, 8, 6, or 4 carbon atoms. In some embodiments, X' is propylene. X' can be divalent or trivalent and is optionally interrupted by at least one functional group that is independently ether, thioether, sulfone, amine, ester, amide, carbamate, or urea. In some embodiments, X' is optionally interrupted by at least one functional group that is independently ether, ester, carbamate, or amino. The phrase "interrupted by at least one functional group" refers to having alkylene or arylalkylene on either side of the functional group. Representative X' groups that are interrupted by at least one functional group include —(CH$_2$)$_{1-10}$OC(O)N(R)—(CH$_2$)$_{1-10}$—, —(CH$_2$)$_{1-10}$O(CH$_2$)$_{1-10}$S(CH$_2$)$_{1-10}$—, —(CH$_2$)$_{1-10}$OC(O)—(CH$_2$)$_{1-10}$—, —(CH$_2$)$_{1-10}$O(CH$_2$)$_{1-10}$O(CO)N(R')—(CH$_2$)$_{1-10}$, and

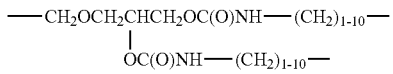

wherein R' is hydrogen or C$_{1-4}$ alkyl.

In some embodiments, Q is —C(O)—N(R')—, and X' is divalent or trivalent alkylene that is optionally interrupted by at least one functional group that is independently ether, ester, carbamate, or amino. In some of these embodiments, X' has up to 8 carbon atoms. In some of these embodiments, X' is

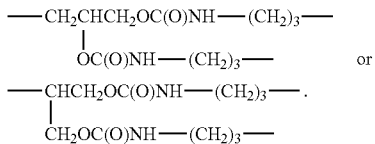

In formulas III and IV, each Y is independently halogen (i.e., fluoride, chloride, bromide, or iodide), alkoxy (i.e., —O-alkyl), acyloxy (i.e., —OC(O)alkyl), polyalkyleneoxy, or aryloxy (i.e., —O-aryl). These Y groups are generally capable of hydrolyzing, for example, in the presence of water to produce silanol groups. Accordingly, at least one Y may also be hydroxyl. In these embodiments, alkyl (e.g., in alkoxy and acyloxy) is optionally substituted with one or more halogen atoms. In some embodiments, alkoxy and acyloxy have up to 8, 6, 4, 3, or 2 carbon atoms. In some embodiments, aryloxy has 6 to 12 (or 6 to 10) carbon atoms and may be unsubstituted or substituted by halogen, alkyl (e.g., having up to 4 carbon atoms), and haloalkyl. Polyalkyleneoxy is, for example, —O—(CH(CH$_3$)—CH$_2$O)$_{q'}$—C$_{1-4}$ alkyl, —O—(CH$_2$—CH$_2$O)$_{q'}$—C$_{1-4}$ alkyl, or a combination thereof (e.g., —O—(CH(CH$_3$)—CH$_2$)$_{q'}$—(CH$_2$—CH$_2$O)$_{q''}$—C$_{1-4}$alkyl with a ratio of q' to q'' of 1:1 to 1:10), and q', q'', or q'+q'' is 1 to 40 (in some embodiments, 2 to 10). In some embodiments, each Y is independently selected from the group consisting of halide, hydroxyl, alkoxy, aryloxy, and acyloxy. In some embodiments, each Y is independently selected from the group consisting of halide (e.g., chloride) and alkoxy having up to ten carbon atoms. In some embodiments, each Y is independently alkoxy having from 1 to 6 (e.g., 1 to 4) carbon atoms. In some embodiments, each Y is independently methoxy or ethoxy.

For some embodiments, including any one of the above embodiments of formulas III and IV, Rf comprises perfluorinated repeating units comprising at least one of —(C$_n$F$_{2n}$O)—, —(CF(Z)O)—, —(CF(Z)C$_n$F$_{2n}$O)—, or —(C$_n$F$_{2n}$CF(Z)O)—; wherein Z is a perfluoroalkyl group or a perfluoroalkoxy group, each of which is optionally interrupted by at least one ether linkage, and n is an integer from 1 to 12 (in some embodiments, 1 to 6, 1 to 4, or 1 to 3). In any of these formulas, Z can be linear, branched, or cyclic and can have 1 to 9 carbon atoms and 0 to 4 oxygen atoms. The perfluorinated repeating units may be arranged randomly, in blocks, or in an alternating sequence.

For some embodiments, including any one of the above embodiments, Rf is monovalent, and z is 1. For some of these embodiments, Rf is terminated with a group selected from the group consisting of C$_n$F$_{2n+1}$—, C$_n$F$_{2n+1}$O—, and R'C$_n$F$_{2n}$O— wherein R' is a hydrogen or chlorine atom. For some of these embodiments, the terminal group is C$_n$F$_{2n+1}$— or C$_n$F$_{2n+1}$O—, wherein n is an integer from 1 to 6 or 1 to 3. For some of these embodiments, the approximate average structure of Rf is C$_3$F$_7$O(CF(CF$_3$)CF$_2$O)$_a$CF(CF$_3$)—, C$_3$F$_7$O(CF$_2$CF$_2$CF$_2$O)$_a$CF$_2$CF$_2$—, or CF$_3$O(C$_2$F$_4$O)$_a$CF$_2$—, wherein "a" has an average value of 3 to 50. In some embodiments, Rf is C$_3$F$_7$O(CF(CF$_3$)CF$_2$O)$_a$CF(CF$_3$)—, wherein "a" has an average value of 4 to 7.

For some embodiments, including any one of the above embodiments except where Rf is monovalent, Rf is divalent, and z is 2. For some of these embodiments, Rf is —CF$_2$O(CF$_2$O)$_m$(C$_2$F$_4$O)$_b$CF$_2$—, —CF$_2$O(C$_2$F$_4$O)$_b$CF$_2$—, —(CF$_2$)$_3$O(C$_4$F$_8$O)$_b$(CF$_2$)$_3$—, or —CF(CF$_3$)—(OCF$_2$CF(CF$_3$))$_b$O—Rf'—O(CF(CF$_3$)CF$_2$O)$_b$CF(CF$_3$)—, wherein Rf' is a perfluoroalkylene group optionally interrupted by at least one ether linkage, m is 1 to 50, and b is 3 to 40. For some of these embodiments, Rf' is (C$_d$F$_{2d}$), wherein d is 2 to 4. For some of these embodiments, Rf is —CF$_2$O(CF$_2$O)$_m$(C$_2$F$_4$O)$_b$CF$_2$—, —CF$_2$O(C$_2$F$_4$O)$_b$CF$_2$—, or —CF(CF$_3$)—(OCF$_2$CF(CF$_3$))$_b$O—(C$_d$F$_{2d}$)—O(CF(CF$_3$)CF$_2$O)$_b$CF(CF$_3$)—, and wherein d is 2 to 4, and the average value of m+b or b+b or b is from about 4 to about 24.

The above described fluorinated silanes represented by formulas III and IV typically include a distribution of oligomers and/or polymers, so m and b may be non-integral. The above structures are approximate average structures where the approximate average is over this distribution. These distributions may also contain perfluoropolyethers with no silane groups or more than two silane groups. Typically, distributions containing less than about 10% by weight of compounds without silane groups can be used.

In formulas III and IV, R is an alkyl group having up to 8 carbon atoms (e.g., methyl, ethyl, n-propyl, isopropyl, n-butyl, sec-butyl, tert-butyl, n-pentyl, isopentyl, neopentyl, n-hexyl, n-heptyl, or n-octyl) or a phenyl group. In some embodiments, R is an alkyl group having up to 4 carbon atoms. In some embodiments, R is methyl or ethyl.

In formula III and IV, x is 0, 1, or 2. In some embodiments, including any one of the above embodiments, x is 0 or 1 (in some embodiments, 0).

In formula III and IV, y is a value from 1 to 8. In some embodiments, y is an integer from 1 to 8. In some embodiments, y is 1 or 2. In some embodiments, X' is terminated by an amine or amide group, and y is 2. In some embodiments, X or X' is a branched or tetravalent group, and y is 2. In some embodiments, y is 1.

In some embodiments, the number average molecular weight of the fluorinated compound represented by formula III or IV in any of their aforementioned embodiments is about 750 to about 6000, or about 800 to about 4000.

In some embodiments, including any one of the above embodiments Rf is —CF$_2$O(CF$_2$O)$_m$(C$_2$F$_4$O)$_b$CF$_2$—, z is 2, y is 1, and X—Si(Y)$_{3-x}$(Z)$_x$ is C(O)NH(CH$_2$)$_3$Si(OCH$_3$)$_3$ or C(O)NH(CH$_2$)$_3$Si(OCH$_2$CH$_3$)$_3$. For some of these embodiments, m and b are each about 9 to 12. In other embodiments, Rf is C$_3$F$_7$O(CF(CF$_3$)CF$_2$O)$_a$CF(CF$_3$)—, z is 1, y is 1, and X—Si(Y)$_{3-x}$(Z) is C(O)NH(CH$_2$)$_3$Si(OCH$_3$)$_3$ or C(O)NH(CH$_2$)$_3$Si(OCH$_2$CH$_3$)$_3$. In other embodiments, Rf is —CF(CF$_3$)—(OCF$_2$CF(CF$_3$))$_b$O—(C$_d$F$_{2d}$)—O(CF(CF$_3$)CF$_2$O)$_b$CF(CF$_3$)—, z is 2, y is 1, and X—Si(Y)$_{3-x}$(Z)$_x$ is C(O)NH(CH$_2$)$_3$Si(OCH$_3$)$_3$ or C(O)NH(CH$_2$)$_3$Si(OCH$_2$CH$_3$)$_3$. In yet other embodiments, Rf is C$_3$F$_7$O(CF(CF$_3$)CF$_2$O)$_a$CF(CF$_3$)—, z is 1, y is 2, a is as defined above, and X—[Si(Y)$_{3-x}$(Z)$_x$]$_y$ is

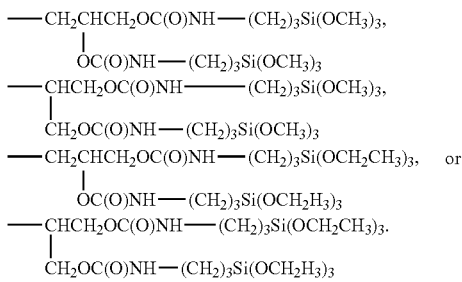

The fluorinated compounds represented by formulas III and IV can be synthesized, for example, from a fluorinated carboxylic acid or salt thereof, an acid fluoride thereof, or a fluorinated carboxylic acid ester (e.g., Rf—[C(O)—OCH$_3$]$_z$) using a variety of conventional techniques. For example, a fluorinated methyl ester can be treated with an amine having formula NH$_2$—X—Si(Y)$_{3-x}$(Z)$_x$ according to the following reaction sequence:

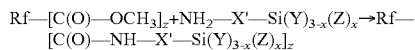

In this sequence, Rf, X', Y, Z, x, and z are as defined in any of the above embodiments. Some amines having formula NH$_2$—X—Si(Y)$_{3-x}$(Z)$_x$ are commercially available (e.g., (3-aminopropyl)trimethoxysilane and (3-aminopropyl)triethoxysilane). The reaction may be carried out, for example, at an elevated temperature (e.g., up to 80° C., 70° C., 60° C., or 50° C.), and may be carried out neat or in a suitable solvent. Conditions for carrying out these transformations are known in the art; see, e.g., U.S. Pat. No. 3,810,874 (Mitsch et al.) and U.S. Pat. No. 3,646,085 (Bartlett), the disclosures of which, relating to the preparation of fluorinated silanes, are incorporated herein by reference.

Some fluorinated methyl esters are commercially available (e.g., CH$_3$OC(O)CF$_2$(OCF$_2$CF$_2$)$_{9-10}$(OCF$_2$)$_{9-10}$CF$_2$C(O)OCH$_3$, a perfluoropolyether diester available from Solvay Solexis, Houston, Tex., under the trade designation "FOMBLIN ZDEAL"). Others can be prepared, for example, through direct fluorination of a hydrocarbon polyether diester using techniques known in the art; see, e.g., methods disclosed in U.S. Pat. No. 5,578,278 (Fall et al.) and U.S. Pat. No. 5,658,962 (Moore et al.). In some embodiments, a fluorinated methyl ester is prepared by oligomerization of hexafluoropropylene oxide (HFPO) and functionalization of the resulting perfluoropolyether carbonyl fluoride according to the methods described in U.S. Pat. No. 4,647,413 (Savu), the disclosure of which is incorporated herein by reference.

Fluorinated compounds represented by formulas III and IV can also be prepared, for example, by reaction of a carboxylic acid ester (e.g., Rf—[C(O)—OCH$_3$]$_z$) with an amino alcohol having formula NH$_2$—X$^1$—OH (e.g., ethanolamine or 3-amino-1,2-propanediol) to prepare fluorinated hydroxyl compound Rf—[(CO)NHX$^1$OH]$_z$ as shown in the following reaction sequence, wherein Rf is as defined in any of the above embodiments, and X$^1$ is a precursor to X', wherein X' is interrupted by at least one ether, ester, or carbamate group.

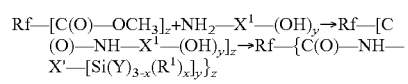

The conditions for the reaction with NH$_2$—X'—Si(Y)$_{3-x}$(Z)$_x$, described above, can be used for the reaction with NH$_2$—X$^1$—OH. The fluorinated hydroxyl compound can then be treated with, for example, a haloalkyl silane (e.g., chloropropyltrimethoxysilane) or an isocyanatoalkyl silane (e.g., 3-isocyanatopropyltriethoxysilane). The reaction with a haloalkyl silane can be carried out, for example, by first treating the fluorinated hydroxyl compound with a base (e.g., sodium methoxide or sodium tert-butoxide) in a suitable solvent (e.g., methanol), optionally at an elevated temperature (e.g., up to the reflux temperature of the solvent), followed by heating (e.g., at up to 100° C., 80° C., or 70° C.) the resulting alkoxide with the haloalkyl silane. The reaction of a fluorinated hydroxyl compound represented by formula Rf—[C(O)—NH—X$^1$—(OH)$_y$]$_z$ with an isocyanatoalkyl silane can optionally be carried out in a suitable solvent (e.g., methyl ethyl ketone), optionally at an elevated temperature (e.g., the reflux temperature of the solvent), and optionally in the presence of a catalyst (e.g., stannous octanoate).

Fluorinated compounds represented by formulas III and IV can also be prepared, for example, by reducing an ester of formula Rf—[C(O)—OCH$_3$]$_z$ or a carboxylic acid of formula Rf—[C(O)—OH]$_z$ using conventional methods (e.g., hydride, such as sodium borohydride, reduction) to a fluorinated hydroxyl compound of formula Rf—[CH$_2$OH]$_z$ as shown in the following reaction sequence, wherein Rf, X, Y, Z, x, and z are as defined in any of the above embodiments, and X is interrupted by at least one ether, ester, or carbamate group.

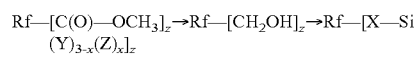

The fluorinated hydroxyl compound of formula Rf—[CH$_2$OH]$_z$ can then be converted, for example, to a silane by reaction with a haloalkyl silane or isocyanatoalkyl silane using the techniques described above. Some useful fluorinated hydroxyl compounds are commercially available (e.g., HOCH$_2$CF$_2$(OCF$_2$CF$_2$)$_{9-10}$(OCF$_2$)$_{9-10}$CF$_2$CH$_2$OH, a perfluoropolyether diol available from Solvay Solexis available under the trade designation "FOMBLIN ZDOL").

Fluorinated hydroxyl compounds can also be treated, for example, with allyl halides (e.g., allyl chloride, allyl bromide, or allyl iodide) under the conditions described above for the reaction of fluorinated hydroxyl compounds with haloalkyl silanes. The resulting allyl-substituted compounds can be treated with, for example, a commercially available, or readily synthesized, mercaptosilane of the formula HS—X'—Si(Y)$_{3-x}$(Z)$_x$, wherein X', Y, Z, and x can be defined as in any of the above embodiments, under free radical conditions. Useful free radical initiators include hydrogen peroxide, potassium persulfate, t-butyl hydroperoxide, benzoyl peroxide, t-butyl perbenzoate, cumene hydroperoxide, 2,2'-azobis(2-methylbutyronitrile), azobis (isobutyronitrile) (AIBN), and free radical photoinitiators such as those described by K. K. Dietliker in Chemistry & Technology of UV & EB Formulation for Coatings, Inks & Paints, Volume 3, pages 276-298, SITA Technology Ltd., London (1991). Conditions for carrying out this transformation are known in the art; see, e.g., U.S. Pat. No. 7,294,731 (Flynn et al.), the disclosure of which, relating to the preparation of fluorinated silanes, is incorporated herein by reference.

Fluorinated hydroxyl compounds can also be treated, for example, with acryloyl halides, esters, anhydrides or acrylic acid to produce fluorinated acrylate esters, which can then be treated, for example, with amines having formula NH$_{(3-y)}$—[X'—Si(Y)$_{3-x}$(Z)$_x$]$_y$, wherein X', Y, Z, x, and y can be defined as in any of the above embodiments, according to the methods described in U. S. Pat. Appl. No. 2008/0220264 (Iyer et al.), the disclosure of which, relating to the preparation of fluorinated silanes, is incorporated herein by reference. The reaction between fluorinated acrylate esters and amines are optionally carried out in dry solvent and optionally in the presence of 0.05 percent to 2 percent by weight catalyst (e.g., a base such as 1,4-dihydropyridines, methyl diphenylphosphane, methyl di-p-tolylphosphane, 2-allyl-N-alkyl imidazolines, tetra-t-butylammonium hydroxide, DBU (1,8-diazabicyclo[5.4.0]undec-7-ene), tetramethylguanidine, DBN (1,5-diazabicyclo[4.3.0]non-5-ene), potassium methoxide, sodium methoxide, or sodium hydroxide). Conveniently, progress of the reaction can be determined using infrared spectroscopy. Fluorinated acrylate esters can also be treated with mercaptosilanes represented by formula HS—X—Si(Y)$_{3-x}$(Z), under similar conditions.

Further details about the preparation of fluorinated compounds useful for practicing the present disclosure can be found in the Examples, below, and references cited therein.

Compositions according to the present disclosure and/or useful for practicing some embodiments of the methods disclosed herein include a non-fluorinated organic solvent having a flashpoint of at least 40° C. In some embodiments, the non-fluorinated organic solvent has a flashpoint of at least 45° C., at least 50° C., or at least 60° C. As used herein, the term "a non-fluorinated organic solvent" includes a single non-fluorinated organic solvent and a mixture of two or more non-fluorinated organic solvents.

Examples of suitable non-fluorinated organic solvents include ethers (e.g., bis(2-methoxyethyl)ether (diglyme), dipropylene glycol dimethyl ether (DMM), and dibutoxymethane (butylal)); ether-alcohols (e.g., dipropylene glycol monomethyl ether (DPM), propylene glycol n-butyl ether (PnB), and dipropylene glycol n-butyl ether (DPnB)); esters (e.g., dimethyl succinate (DMS)); ether-esters (e.g., dipropylene glycol methyl ether acetate (DPMA)), alcohol esters (e.g., methyl lactate, ethyl lactate, and butyl lactate); and keto-esters (e.g., methyl acetoacetate (MeAcAc) and t-butyl acetoacetate (tBuAcAc). In some embodiments, the non-fluorinated organic solvent has a boiling point of up to 250° C., 230° C., 225° C., 210° C., or 200° C. Such solvents can be readily evaporated after the composition is coated on a substrate, for example. The flashpoints and boiling points for some examples of useful solvents are shown in the table, below. For the purposes of this application, the flashpoint of the non-fluorinated organic solvent is measured by the closed cup method.

| Solvent | Fp (° C.) | Bp (° C.) | Solvent | Fp (° C.) | Bp (° C.) |
|---|---|---|---|---|---|
| diglyme | 57 | 162 | DPMA | 86 | 200 |
| DMM | 65 | 175 | Methyl lactate | 49 | 145 |
| butylal | 62 | 182 | Ethyl lactate | 46 | 151 |
| DPM | 75 | 190 | Butyl lactate | 71 | 190 |
| PnB | 63 | 171 | t-BuAcAc | 76 | 190 |
| DPnB | 100 | 230 | MeAcAc | 70 | 170 |
| DMS | 90 | 200 | | | |

In some embodiments, compositions according to the present disclosure and/or useful for practicing the methods disclosed herein include a fluorinated solvent having a flashpoint of at least 40° C. In some embodiments, the fluorinated solvent has a flashpoint of at least 45° C., at least 50° C., or at least 60° C. In either of these embodiments, the fluorinated solvent may be a hydrofluoroether. In some embodiments, the hydrofluoroether is represented by formula Rf$^3$—[O—R$_h$]$_f$, wherein f is an integer from 1 to 3; Rf$^3$ is a perfluoroalkyl or di- or trivalent perfluoroalkylene, each of which may be interrupted with at least one —O—, —S—, or —NH—; and R$_h$ is an alkyl group optionally interrupted with at least one —O—, —S—, or —NH—. In some embodiments, when f is 1, Rf$^3$ is selected from the group consisting of linear or branched perfluoroalkyl groups having from 2 to about 15 carbon atoms, perfluorocycloalkyl-containing perfluoroalkyl groups having from 5 to about 15 carbon atoms, and perfluorocycloalkyl groups having from 3 to about 12 carbon atoms. In some embodiments, when x is 2, Rf$^3$ is selected from the group consisting of linear or branched perfluoroalkanediyl groups or perfluoroalkylidene groups having from 2 to about 15 carbon atoms, perfluorocycloalkyl- or perfluorocycloalkylene-containing perfluoroalkanediyl or perfluoroalkylidene groups having from 6 to about 15 carbon atoms, and perfluorocycloalkanediyl groups or perfluorocycloalkylidene groups having from 3 to about 12 carbon atoms. In some embodiments, when x is 3, Rf$^3$ is selected from the group consisting of linear or branched perfluoroalkanetriyl groups having from 2 to about 15 carbon atoms, perfluorocycloalkyl- or perfluorocycloalkylene-containing perfluoroalkanetriyl groups having from 6 to about 15 carbon atoms, and perfluorocycloalkanetriyl groups having from 3 to about 12 carbon atoms. In some embodiments of formula Rf$^3$—[O—R$_h$]$_f$, each R$_h$ is independently selected from the group consisting of linear or branched alkyl groups having from 1 to about 8 carbon atoms, cycloalkyl-containing alkyl groups having from 4 to about 8 carbon atoms, and cycloalkyl groups having from 3 to about 8 carbon atoms. In some embodiments, the sum of the number of carbon atoms in Rf$^3$ and the number of carbon atoms in R$_h$ is greater than or equal to 4. The perfluorocycloalkyl and perfluorocycloalkylene groups contained within the perfluoroalkyl, perfluoroalkanediyl, perfluoroalkylidene and perfluoroalkanetriyl groups can optionally (and independently) be substituted with, e.g., one or more perfluoroalkyl groups having from 1 to about 4 carbon atoms. Examples of useful hydrofluoroethers include methyl perfluorobutyl ether, ethyl perfluorobutyl ether, and those obtained from 3M Company, St. Paul, Minn., under the trade designation "NOVEC 7100" or "NOVEC 7200". In the compositions and methods according to the present disclosure, the amount of fluorinated solvent in the composition can be at least 0.1% by weight up to 99.9% by weight, based on the total weight of the composition. When used in combination with a non-fluorinated solvent having a flashpoint of at least 40° C., in some embodiments, at least 45° C., 50° C., or 60° C., the fluorinated solvent can be present in an amount of up to 85%, 80%, 75%, 50%, 40%, 30%, 20%, or 10% by weight, based on the total weight of the composition. In some of these embodiments, the fluorinated solvent is present in an amount of up to 5%, 4%, 3%, 2%, 1%, 0.5%, or 0.25% by weight, based on the total weight of the composition.

Compositions according to the present disclosure and/or useful for practicing the methods disclosed herein include up to one percent by weight of an organic solvent having a flashpoint up to 40° C., in some embodiments, up to 45° C., 50° C., or 60° C. For the purposes of this application, the flashpoint of the organic solvent is measured by the closed cup method. The limit of "up to one percent by weight" by weight includes compositions that are free of such organic solvents. Organic solvents that have flashpoints up to 40° C. include certain alcohols (e.g., methanol, ethanol, and isopropanol); ketones (e.g., acetone, 2-butanone, and 2-methyl-4-pentanone); esters (e.g., ethyl acetate, butyl acetate, and methyl formate); and ethers (e.g., diethyl ether, diisopropyl ether, methyl t-butyl ether, 1-methoxy-2-propanol, and dimethoxyethane (glyme)). While certain of these solvents (e.g., methanol, ethanol, isopropanol, or a mixture thereof) have been found useful for dissolving fluorinated silanes, these solvents are flammable, which limits their utility in some applications, for example, by requiring explosion-proof equipment. The flashpoints and boiling points for some of these solvents are shown in the table, below.

| Solvent | Fp (° C.) | Bp (° C.) | Solvent | Fp (° C.) | Bp (° C.) |
|---|---|---|---|---|---|
| methanol | 12 | 65 | Ethyl acetate | −4 | 77 |
| ethanol | 13 | 78 | Methyl formate | −19 | 32 |
| 2-propanol | 13 | 83 | Butyl acetate | 22 | 126 |
| acetone | −20 | 56 | Diisopropyl ether | −28 | 69 |
| 2-butanone | −9 | 80 | glyme | −2 | 84 |

Flashpoint is commonly used to classify materials as flammable or combustible. As defined by the U.S. Occupational Safety and Health Administration (OSHA), a flammable liquid has a flashpoint below 100° F. (37.8° C.). Flammable liquids may have components with flashpoints of 100° F. (37.8° C.) or higher if such components make up less than 99 percent of the total volume of the liquid. As defined by the U.S. Department of Transportation (DOT), a flammable liquid has a flashpoint below 141° F. (60.5° C.) or has a flashpoint at or above 100° F. (37.8° C.) and is intentionally heated and offered for transportation or transported at or above its flashpoint in a bulk package. Flammable liquids may have components with flashpoints of 100° F. (37.8° C.) or higher if such components make up less than 99 percent of the total volume of the liquid and the mixture is offered for transportation or transported at or above its flashpoint. A liquid is considered 'combustible' when the flashpoint is above 60.5° C. according to DOT and above 37.8° C. according to OSHA. The UN Globally Harmonized System of Classification and Labeling of Chemicals (GHS) is an international system created by the UN to address the classification of chemicals by types of hazard and harmonize hazard communication elements, including labels and safety data sheets. According to GHS, a category 1 flammable liquid has a flashpoint of less than 23° C. and a boiling point of up to 35° C.; a category 2 flammable liquid has a flashpoint of less than 23° C. and a boiling point of greater than 35° C.; a category 3 flammable liquid has a flashpoint of at least 23° C. and a boiling point of up to 60° C.; and a category 4 flammable liquid has a flashpoint of greater than 60° C. and a boiling point of up to 93° C. In some embodiments, compositions according to the present disclosure may be considered nonflammable or combustible according to at least one of the above definitions. Therefore, the compositions may be applied within enclosed environments without requiring explosion-proof equipment.

The concentration of amino-functional compound of formula I or II, fluorinated compound of formula III and IV, and any other components in the organic solvent may be chosen to provide a composition without insoluble fractions. When the treatment composition is used with a primer as described below, the concentration of fluorinated compound of formula III and IV and any other components in the organic solvent may be chosen to provide a composition without insoluble fractions. Compositions according to the present disclosure include a concentration of the fluorinated compound of formula III or IV low enough such that the composition is clear or hazy, but no precipitation or phase separation occurs. Such compositions are capable of forming homogeneous coatings on a substrate (e.g., a metal substrate). Whether or not the composition has no insoluble fractions (e.g., no precipitation or phase separation) and/or is capable of forming a homogeneous coating on a substrate depends on a variety of factors, for example, the concentration of the fluorinated compound, the concentration of any amino-functional compound, the selection of the non-fluorinated organic solvent, the presence of any fluorinated organic solvents, and the presence of any other additives. Using the guidance described herein regarding these factors, a person skilled in the art will be able to make a composition without insoluble fractions capable of forming a homogeneous coating on a substrate (e.g., a metal substrate).

The composition according to the present disclosure and/or useful for practicing any embodiments of the methods disclosed herein typically includes from at least 0.01, 0.015, 0.02, 0.025, 0.03, 0.035, 0.04, 0.045, or 0.05 percent by weight, up to 0.1, 0.2, 0.3 or 0.4 percent by weight of at least one fluorinated compound represented by formula III or IV, based on the total weight of the composition. For example, the amount of a fluorinated compound represented by formula III or IV in the composition may be in a range of from 0.01 to 0.4, 0.01 to 0.3, 0.01 to 0.2, 0.02 to 0.2, 0.01 to 0.1, or from 0.02 to 0.1 percent by weight, based on the total weight of the composition. Lower or higher amounts of the fluorinated compound may also be useful (e.g., in embodiments in which the composition further includes a hydrofluoroether) and may be desirable for some applications. Surprisingly, compositions including fluorinated compounds of formula III and IV and amino-functional compounds having at least one silane group can be prepared in several high-flashpoint solvents, giving excellent easy-clean performance on metal substrates even at concentrations of up to 0.4, less than 0.4, up to 0.3, 0.2, or 0.1 percent by weight, based on the total weight of the composition.

Some embodiments of the composition according to the present disclosure and/or useful for practicing any embodiments of the methods disclosed herein can also include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, or 0.5 percent by weight, up to 1, 1.5, or 2 percent by weight of at least one amino-functional compound, in some embodiments, secondary or tertiary amino-functional compound, based on the total weight of the composition, in addition to the fluorinated compound. For example, the amount of an amino-functional compound in a treatment composition may be in a range of from 0.01 to 2, 0.01 to 1, 0.05 to 2, 0.05 to 1, or from 0.1 to 1 percent by weight, based on the total weight of the treatment composition. Lower or higher amounts of the amino-functional compound may also be useful and may be desirable for some applications.

In some embodiments, compositions according to the present disclosure and/or primer compositions useful for practicing the present disclosure comprise acid. In some embodiments, the acid comprises at least one of (i.e., comprises one or more of) acetic acid, citric acid, formic acid, triflic acid, perfluorobutyric acid, sulfuric acid, or hydrochloric acid. In some embodiments, the acid is hydrochloric acid. Stronger acids typically effect the hydrolysis of silane groups at a lower temperature than weaker acids and are therefore sometimes desirable. The acid may be present in the composition and/or primer composition in a range, for example, from about 0.004, 0.007, 0.01, or 0.015 percent by weight to about 1, 1.5, 2, 2.5, or 3 percent by weight, based on the total weight of the composition. In some embodiments, the acid is present in an amount up to 0.5, 0.4, 0.3, 0.2, or 0.1 percent by weight based on the total weight of the composition. In some embodiments, the acid is hydrochloric acid and is present in the primer composition or treatment composition in a range from 0.004 to 0.05 percent by weight, based on the total weight of the composition. The presence of acid is reported to speed up the rate of hydrolysis of the silane groups in the fluorinated silane and amino-functional silane. However, advantageously, we have found that no acid catalyst is needed in the composition according to and/or useful for practicing the present disclosure to obtain good easy-to-clean performance. Accordingly, in some embodiments, the composition is essentially free of an acid catalyst. The phrase "essentially free of an acid catalyst" means that the composition may include an acid catalyst in an amount up to 0.003, 0.002, or 0.001 percent by weight, based on the total weight of the composition. Compositions that are "essentially free of an acid catalyst" may also be free of an acid catalyst.

In some embodiments, compositions according to the present disclosure and/or primer compositions useful for practicing the present disclosure comprise water. In some embodiments, the water is present in the composition in a range from 0.01 percent to 5 percent (in some embodiments, 0.05 to 1, 0.05 to 0.5, or 0.1 to 0.5 percent) by weight, based on the total weight of the composition. Water may be added to the primer and/or treatment composition separately or may be added as part of an aqueous acidic solution (e.g., concentrated hydrochloric acid is 37% by weight of the acid in water). However, we have found that it is typically not necessary to add water to the compositions described herein. The water useful for hydrolysis of the silane groups may be adventitious water in the solvent or adsorbed to the surface of the substrate or may be present in the atmosphere to which the amino-functional compound and the fluorinated compound are exposed.

In some embodiments, the amount of non-fluorinated solvent having a flashpoint of at least 40° C., in some embodiments, at least 45° C., 50° C., or 60° C., in compositions according to the present disclosure and/or useful for practicing the present disclosure can make up the remainder of the weight after accounting for the other components described above. In some embodiments, the amount of non-fluorinated solvent having a flashpoint of at least 40° C. (in some embodiments, at least 45° C., 50° C., or 60° C.) is at least 10%, 20%, 30%, 40%, 50%, 60%, 70%, 80%, 90%, 95%, 99%, or 99.5% by weight and can be up to 99.9% by weight or more, based on the total weight of the composition.

The present disclosure provides methods of making a treated article having a metal surface. The metal surface that may be treated according to the present disclosure may comprise any metal and/or metal alloy that is solid at room temperature. In some embodiments, the metal surface comprises at least one of chromium, chromium alloys, iron, aluminum, copper, nickel, zinc, tin, stainless steel, and brass. An article to be treated may include layers of one or more of these metals.

In some embodiments, the metal surface treated as described in the present disclosure comprises a chromated surface such as a chromated steel surface. Chemical conversion coatings (e.g., chromate or phosphate coatings) can be used to improve the corrosion resistance and adhesion capabilities of some metals (e.g., galvanized steel, zinc, and aluminum). Chromating solutions, which are acidic and function by dissolving some of the surface metal of the substrate to be chromated, are specifically designed for the metal to be treated. Chromated surfaces may contain various levels of hexavalent chromium depending on the type of chromating solution.

In some embodiments, the metal surface treated according to the present disclosure comprises at least one of stainless steel or aluminum. The stainless steel that may be treated as described herein includes a variety of grades. For example, the article can have a surface of austenitic, ferritic, or martensitic stainless steel containing at least about 10 (in some embodiments, 11, 12, 13, 14, 15, 16, 17, 18, 19, or 20) percent by weight of chromium. When the chromium content in the stainless steel is at least about 10 percent by weight, the steel can generally readily be formed into a desired shape. Specific types of suitable stainless steels include 430, 304, and 316. Stainless steel generally forms a passivation layer of chromium(III) oxide on its surface. Stainless steel can be resistant to some types of surface treatments that are typically used to improve adhesion such as surface abrasion and is typically not treated with a chemical conversion coating as described above. While adhesion (e.g., of a coating) to some metals is improved by surface abrasion of the metal, stainless steel tends to work-harden under abrasive treatments.

In some embodiments, the metal surface treated according to the present disclosure is present on a part composed of a polymeric or composite material. According to some embodiments, the polymeric or composite material is selected from the group consisting of polyolefins (polypropylene, polyethylene, high density polyethylene, blends of polypropylene), polyamide 6 (PA6), acrylonitrile butadiene styrene (ABS), polycarbonate (PC), PC/ABS blends, polyvinyl chloride (PVC), polyamide (PA), polyurethane (PUR), thermoplastic elastomers (TPE), polyoxymethylene (POM), polystyrene, poly(methyl) methacrylate (PMMA), clear coats for vehicles, composite materials like fiber reinforced plastics, and any combinations or mixtures thereof. In some embodiments, the metal surface for use herein may be present on a chrome-plated part, in particular a part chrome-plated by a galvanization process, in particular electrolytical galvanization or hot-dip galvanization process, wherein the chrome-plated part includes any of the polymeric and composite materials described above.

Examples of articles having a metal surface that may be advantageously treated according to the method described herein include kitchen and bathroom faucets, taps, handles, spouts, sinks, drains, hand rails, towel holders, curtain rods, dish washer panels, refrigerator panels, stove tops, stove, oven, and microwave panels, exhaust hoods, grills, automotive wheels or rims, and chemical reactors. Stainless steel articles that are treated according to the present disclosure include those having stainless steel surfaces in a wide range of thicknesses, depending on the application.

In some embodiments, the method according to the present disclosure includes treating the metal surface with a composition including the amino-functional compound having at least one silane group and a fluorinated compound represented by formula $Rf\{X-[Si(Y)_{3-x}(R)_x]_y\}_z$. In these embodiments, the composition can include any fluorinated or non-fluorinated solvent described above having a flashpoint of at least 40° C. In some embodiments, the fluorinated compound is represented by formula $Rf\{C(O)NR'-X''-[Si(Y)_{3-x}(R)]_y\}_z$, in which Rf, R', R, Y, x, y, and z are as defined above in connection with Formulas III and IV in any of their embodiments. In these embodiments, X" is a divalent or trivalent organic linking group comprising at least one of alkylene or arylalkylene, each of which is optionally interrupted by at least one carbamate or urea. In some embodiments, X" has up to 10, 8, 6, or 4 carbon atoms. Hydrolysis of at least some of the hydrolysable groups Y of the fluorinated compounds and amino-functional compounds typically generates silanol groups, which participate in condensation reactions to form siloxanes. The water useful for hydrolysis may be added to the composition, may be adventitious water in the solvent or adsorbed to the surface of the substrate, or may be present in the atmosphere to which the amino-functional compound and the fluorinated compound are exposed (e.g., an atmosphere having a relative humidity of at least 10%, 20%, 30%, 40%, or even at least 50%). In a treated article prepared by this method, there is a layer formed on at least a portion of a metal surface. Without wanting to be bound by theory, it is believed that the layer includes a siloxane that includes a reaction product of the amino-functional compound having at least one silane group and a fluorinated compound that is represented by formula $Rf^1\{X-[Si(Y')_{3-x}(R)_x]_y\}_z$. In this formula each Y' is independently halogen, alkoxy, hydroxyl, acyloxy, polyalkyleneoxy, or aryloxy as defined in any of their embodiments described above in connection with the definition of Y. In the layer formed on the treated article, Y' may also be —O— bonded to the amino-functional compound, forming at least one siloxane bond, or —O— bonded to the metal surface. In some of these embodiments, the bond may be a covalent bond or hydrogen bond, for example. Rf, X", R, x, y, and z are as defined above in any of their embodiments. In some embodiments of the treated article, the layer formed on the metal surface is a partial condensate of the amino-functional compound and the fluorinated compound.

In some embodiments of the methods according to the present disclosure, the method includes treating the metal surface with a primer composition including the amino-functional compound having at least one silane group to provide a primed metal surface and subsequently treating the primed metal surface with a treatment composition including the fluorinated compound. The amino-functional compound and fluorinated compound may be as described above in any of their embodiments. In the primer composition, the concentration of the amino-functional compound and any other components in the organic solvent may be chosen to provide a homogeneous primer composition. A primer composition useful for practicing the present disclosure typically includes from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, or 0.5 percent by weight, up to 1, 1.5, or 2 percent by weight of at least one amino-functional compound, in some embodiments, secondary or tertiary amino-functional compound, based on the total weight of the primer composition. For example, the amount of an amino-functional compound in a primer composition may be in a range of from 0.01 to 2, 0.01 to 1, 0.05 to 2, 0.05 to 1, or from 0.1 to 1 percent by weight, based on the total weight of the primer composition. Lower or higher amounts of the amino-functional compound may also be useful, and may be desirable for some applications.

When the amino-functional compound is used as a primer, it is believed that the amino group can react with and/or form a chelate with the metal surface. At least some of the hydrolysable Y groups in the $Si(Y)_p(R^2)_{3-p}$ groups are then hydrolyzed to form silanol groups. The water useful for hydrolysis may be added to the primer composition, may be adventitious water in the solvent or adsorbed to the surface of the substrate, or may be present in the atmosphere to which the amino-functional compound is exposed (e.g., an atmosphere having a relative humidity of at least 10%, 20%, 30%, 40%, or even at least 50%). Before the treatment composition is added, the primer composition is typically allowed to remain on the metal surface for a sufficient time to allow silanol groups to form. The silanol groups can then react with the hydrolysable groups (e.g., alkoxy, acyloxy, or halogen) on the silane groups of the fluorinated compound to form siloxane bonds. The primer composition typically is not allowed to remain on the metal surface for such a length of time that all of the silanol groups react to form siloxane bonds, at which point the primer no longer has reactive groups to react with the silanes on the fluorinated compound. When the amino-functional silane is used as a primer, it has been found that one to five hours at room temperature may be a time sufficient to allow silanol groups to form without allowing the detrimental formation of too many siloxane bonds. Also, it has been found that five to 60 minutes at an elevated temperature such as 100° C. to 150° C. may be a time sufficient to allow silanol groups to form without allowing the detrimental formation of too many siloxane bonds.

In a treated article made from the method in which the amino-functional compound is used as a primer, at least a portion of the metal surface is in contact, bonded to, or chelated with the amino-functional compound. The amino-functional compound forms a layer on at least a portion of the metal surface, and the formed layer typically includes at least one siloxane bond shared with the fluorinated compound. All the silanes in the amino-functional compound may be converted to siloxanes, either by condensation with the fluorinated compound or by self-condensation, or some unreacted silanes or uncondensed silanols may remain on the amino-functional compound. When the fluorinated compound is bonded to the amino-functional compound, the fluorinated compound may be represented by formula Rf{—

X—[Si(Y')$_{3-x}$(R)$_x$]$_y$}$_z$, in which Rf, X, R, x, y, and z are as defined above in any of their embodiments described above in connection with Formulas III and IV. Each Y' is independently halogen, alkoxy, hydroxyl, acyloxy, polyalkyleneoxy, or aryloxy as defined in any of their embodiments described above in connection with the definition of Y. In the treated article, Y' may also be —O— bonded to the amino-functional compound, forming at least one siloxane. In some of these embodiments, the bond may be a covalent bond or hydrogen bond, for example. All the silanes in the fluorinated compound may be converted to siloxanes, either by condensation with the amino-functional compound or by self-condensation, or some unreacted silanes or uncondensed silanols may remain on the fluorinated compound. In some embodiments, the layer on the metal surface is a partial condensate of the amino-functional compound and the fluorinated compound.

In embodiments of the method in which the amino-functional compound is used as a primer, it is typically possible to analyze the treated article to find a layer rich in the amino-functional compound and a layer rich in the fluorinated compounds, for example, using ESCA or other analytical techniques.

In some embodiments, the surface of the metal surface to be treated may be cleaned before treatment. It is typically desirable to remove foreign materials such as dust, oil, grease, and other contamination. Cleaning may be carried out, for example, with an organic solvent (e.g., a ketone such as acetone, an alcohol such as isopropanol, or an alkane such as heptane), with a sequence of organic solvents, with water, with a solution of sodium hydroxide (e.g., 2, 5, or 10 percent by weight aqueous sodium hydroxide), or with a combination thereof. The cleaning may be carried out at room temperature or at an elevated temperature (e.g., in a range from about 50° C. to about 100° C. or higher). Techniques for cleaning a metal surface include wiping, rinsing, sonicating, and heating at very high temperature (e.g., 400° C.). After cleaning, the metal surface of the substrate may be dried, for example, under a stream of air or nitrogen or at an elevated temperature.

A wide variety of methods can be used to treat a metal surface with the composition according to the present disclosure and, in some embodiments, a primer composition disclosed herein (e.g., brushing, spraying, dipping, bar coating, wiping, rolling, spreading, or chemical vapor deposition). A metal surface can typically be treated with the composition (and, in some embodiments, primer composition) at room temperature (typically, about 15° C. to about 30° C. or about 20° C. to about 25° C.). Or the composition can be applied to surfaces that are preheated (e.g., at a temperature of 60° C. to 150° C.). Following application, the treated article can be dried and cured at ambient or elevated temperature (e.g., at 40° C. to 300° C., 50° C. to 150° C., or 75° C. to 140° C.) and for a time sufficient to dry (e.g., ten minutes at 140° C.). In some embodiments, repellent and durable surface treatments according to the present disclosure can be obtained upon treating an article and drying at ambient temperature (e.g., for up to 48 hours or 24 hours). Easy-to-clean articles prepared according to the present disclosure wherein the treatment composition is dried typically no longer have organic solvent or water present on the surface.

In some embodiments, including any one of the above embodiments, the method of making an easy-to-clean article having a metal surface further comprises subjecting at least the surface to an elevated temperature after treating the metal surface with the composition, in some embodiments, the treatment composition after the primer composition.

Compositions according to the present disclosure may be applied to a metal surface either shortly after their preparation (e.g., up to one hour), or after standing at room temperature for a period of time (e.g., more than 1 hour, 3 to 8 hours, several days, or several weeks). Hydrolysis and condensation of the fluorinated silanes may be more likely to occur after compositions are exposed to time and temperature.

Compositions according to the present disclosure may be prepared from a concentrate (e.g., a concentrated solution of a fluorinated compound represented by formula III or IV in organic solvent). The concentrate may be stable for several weeks (e.g., at least one, two, or three months) and may comprise the fluorinated compound in an amount of at least 10, 20, 25, 30, or at least 40 percent by weight, based on the total weight of the concentrate. Concentrates may be diluted shortly before use, for example, with non-fluorinated or fluorinated organic solvent having a flashpoint of at least 40 OC and optionally additional fluorinated compound, the amino-functional compound, and, in some embodiments, water or acid.

In some embodiments, including any one of the above embodiments of the methods according to the present disclosure, the thickness of the treatment is less than 1 micrometer, typically less than 500 nanometers. In some embodiments, the thickness of the treatment is at least about 10, 20, 30, or 50 nanometers, up to about 100, 150, or 200 nanometers. Thin coatings made according to the methods disclosed herein typically and advantageously are transparent and do not change the visual appearance, thermal conductivity, or mechanical properties of the metal surface.

The easy-to-clean performance of the treated articles made by methods disclosed herein is typically measured by evaluating contact angles of at least one of water or hydrocarbon (e.g., hexadecane) on the treated surface. In this application, water contact angles are measured at room temperature (e.g., about 25° C. to 30° C.) using equipment obtained from Kruss GmbH, Hamburg, Germany, and are usually measured several times to obtain an average measurement. In some embodiments of the methods disclosed herein, the treated metal surface has an initial static contact angle versus water of at least 90 (in some embodiments, at least 95, 97, 98, 100, 105, or 110) degrees. In these embodiments, "initial" refers to contact angles measured for the treated metal surface about 24 hours after treating the surface and before any abrading or wiping of the treated metal surface.

Metal surfaces treated according to the methods of the present disclosure typically provide durable easy-to-clean performance (i.e., the easy-to-clean performance is maintained after cleaning the surface several times). In this application, durability is measured by measuring contact angles versus water or hydrocarbon (e.g., hexadecane) of a treated metal plate before and after being subjected to abrasion. Abrasion is carried out by abrading the treated substrates on an abrasion tester (obtained from Erichsen GmbH & Co. KG, Hemer, Germany) and scrubbing for 4000 cycles with the yellow side of a sponge obtained from 3M Company, St. Paul, Minn. under the trade designation "SCOTCHBRITE", which is water-wet. In some embodiments of the methods and articles disclosed herein, the treated metal surface has a static contact angle versus water of at least 85 (in some embodiments, at least 90, 95, 100, or 105) degrees after 4000 cycles of abrasion as described above.

The easy-to-clean performance of the treated articles made by methods disclosed herein is also measured by visually evaluating how a permanent marker wets out the treated surface (stain repellency), how easily the marker can be removed from the surface (ease of stain removal), and whether the mark remains on the surface (stain resistance). The durability of this easy-to-clean performance is measured before and after abrasion.

The easy-to-clean performance of the treated articles made by methods disclosed herein is also measured by visually evaluating how a fingerprint marks the treated surface (fingerprint resistance), how easily the fingerprint can be removed from the surface (ease of fingerprint removal), how sunscreen marks the treated surface (sunscreen resistance), and how easily the sunscreen can be removed from the surface (ease of sunscreen removal). The durability of this easy-to-clean performance is measured before and after abrasion.

The composition and method according to the present disclosure provides treated substrates with at least one of surprisingly high contact angles, high stain repellency, easy stain removal, high stain resistance, high fingerprint and sunscreen resistance, or easy fingerprint and sunscreen removal even with a concentration of fluorinated compound low enough to provide a homogeneous coating. In specific examples, at concentrations of at least 0.2 percent by weight of the fluorinated compound in propyleneglycol n-butyl ether (PnB), the composition provided an irregular coating that changed the appearance of the surface. In contrasting specific examples, at concentrations of less 0.2 percent by weight of the fluorinated compound in propyleneglycol n-butyl ether (PnB), the composition provided a regular coating that did not change the appearance of the surface and provided surprisingly good easy-to-clean performance. The compositions according to the present disclosure are effective even in the absence of an acid catalyst.

SOME EMBODIMENTS OF THE DISCLOSURE

In a first embodiment, the present disclosure provides a composition comprising;
an amino-functional compound having at least one silane group;
a fluorinated compound represented by formula:

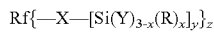
Rf{—X—[Si(Y)$_{3-x}$(R)$_x$]$_y$}$_z$ wherein:
Rf is a polyfluoropolyether group;
X is a divalent or trivalent organic linking group;
each Y is independently halogen, alkoxy, hydroxyl, acyloxy, polyalkyleneoxy, or aryloxy;
R is an alkyl group having up to 8 carbon atoms or a phenyl group;
x is 0 or 1 or 2;
y is a value from 1 to 8; and
z is 1 or 2; and
a non-fluorinated organic solvent having a flashpoint of at least 40° C.,
wherein the composition comprises up to one percent by weight of an organic solvent having a flashpoint up to 40° C.

In a second embodiment, the present disclosure provides the composition of the first embodiment, further comprising a hydrofluoroether having a flashpoint of at least 40° C.

In a third embodiment, the present disclosure provides the composition of the second embodiment, wherein the hydrofluoroether is represented by formula Rf$^3$—[O—R$_h$]$_f$, wherein f is an integer from 1 to 3; Rf$^3$ is a perfluoroalkyl or di- or trivalent perfluoroalkylene, each of which may be interrupted with at least one —O—; and R$_h$ is an alkyl group optionally interrupted with at least one —O—.

In a fourth embodiment, the present disclosure provides a method of making a treated article having a metal surface, the method comprising treating the metal surface with the composition of any one of the first to third embodiments.

In a fifth embodiment, the present disclosure provides a method of making a treated article having a metal surface, the method comprising treating the metal surface with a composition comprising;
an amino-functional compound having at least one silane group;
a fluorinated compound represented by formula:

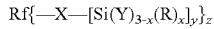
Rf{—X—[Si(Y)$_{3-x}$(R)$_x$]$_y$}$_z$ wherein:
Rf is a polyfluoropolyether group;
X is a divalent or trivalent organic linking group;
each Y is independently halogen, alkoxy, hydroxyl, acyloxy, polyalkyleneoxy, or aryloxy;
R is an alkyl group having up to 8 carbon atoms or a phenyl group;
x is 0 or 1 or 2;
y is a value from 1 to 8; and
z is 1 or 2; and
an organic solvent having a flashpoint greater than 40° C.,
wherein the composition comprises up to one percent by weight of an organic solvent having a flashpoint up to 40° C.

In a sixth embodiment, the present disclosure provides the composition or method of any one of the first to fifth embodiments, wherein the fluorinated compound is present in the composition in an amount up to 0.4 percent, 0.3 percent, 0.2 percent, or 0.1 percent by weight, based on the total weight of the composition.

In a seventh embodiment, the present disclosure provides the composition or method of any one of the first to sixth embodiments, wherein the amino-functional compound is present in the composition in a range from 0.01 percent to 2 percent by weight, based on the total weight of the composition.

In an eighth embodiment, the present disclosure provides a method of making a treated article having a metal surface, the method comprising:
treating the metal surface with a primer composition comprising an amino-functional compound having at least one silane group to provide a primed metal surface; and
subsequently treating the primed metal surface with a treatment composition comprising a fluorinated compound represented by formula:

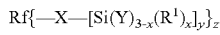
Rf{—X—[Si(Y)$_{3-x}$(R$^1$)$_x$]$_y$}$_z$ wherein:
Rf is a polyfluoropolyether group;
X is a divalent or trivalent organic linking group;
each Y is independently halogen, alkoxy, hydroxyl, acyloxy, polyalkyleneoxy, or aryloxy;
R$^1$ is an alkyl group having up to 8 carbon atoms or a phenyl group;
x is 0 or 1 or 2;
y is 1 or 2; and
z is 1 or 2,
wherein each of the primer composition and the treatment composition independently comprises an organic solvent having a flashpoint greater than 40° C. and comprises up to one percent by weight of an organic solvent having a flashpoint up to 40° C.

In a ninth embodiment, the present disclosure provides the method of the eighth embodiment, wherein the fluorinated compound is present in the treatment composition in an amount up to 0.4 percent, 0.3 percent, 0.2 percent, or 0.1 percent by weight, based on the total weight of the composition.

In a tenth embodiment, the present disclosure provides the method of the eighth or ninth embodiment, wherein the amino-functional compound is present in the primer composition in a range from 0.01 percent to 2 percent by weight, based on the total weight of the composition.

In an eleventh embodiment, the present disclosure provides the method of any one of the fifth to tenth embodiments, wherein the organic solvent having a flashpoint greater than 40° C. is non-fluorinated.

In a twelfth embodiment, the present disclosure provides the method of any one of the fifth to tenth embodiments, wherein the organic solvent having a flashpoint greater than 40° C. is a hydrofluoroether.

In a thirteenth embodiment, the present disclosure provides the method of the twelfth embodiment, wherein the hydrofluoroether is represented by formula $Rf^3-[O-R_h]_f$, wherein f is an integer from 1 to 3; $Rf^3$ is a perfluoroalkyl or di- or trivalent perfluoroalkylene, each of which may be interrupted with at least one —O—; and $R_h$ is an alkyl group optionally interrupted with at least one —O—.

In a fourteenth embodiment, the present disclosure provides the method of any one of the fourth to thirteenth embodiments, wherein the metal substrate comprises at least one of chromium, a chromium alloy, iron, aluminum, copper, nickel, zinc, tin, stainless steel, or brass.

In a fifteenth embodiment, the present disclosure provides the composition or method of any one of the first to fourteenth embodiments, wherein the composition is essentially free of an acid catalyst.

In a sixteenth embodiment, the present disclosure provides the composition or method of any one of the first to fourteenth embodiments, wherein the treatment composition further comprises an acid catalyst.

In a seventeenth embodiment, the present disclosure provides the composition or method of any one of the first to sixteenth embodiments, wherein the fluorinated compound is represented by formula $Rf\{Q-X'-[Si(Y)_{3-x}(R)_x]_y\}_z$, wherein Q is a bond, —C(O)—N(R')—, —C(O)—O—, or —SO$_2$N(R')—, wherein R' is hydrogen or alkyl having up to 4 carbon atoms; and X' is a divalent or trivalent organic linking group comprising at least one of alkylene or arylalkylene, each of which is optionally interrupted by at least one functional group that is independently ether, thioether, sulfone, amine, ester, amide, carbamate, or urea.

In an eighteenth embodiment, the present disclosure provides the composition or method of the seventeenth embodiment, wherein Q is —C(O)—N(R')—, wherein X' is divalent or trivalent alkylene that is optionally interrupted by at least one functional group that is independently ether, ester, carbamate, or urea.

In a nineteenth embodiment, the present disclosure provides the composition or method of the eighteenth embodiment, wherein X' is divalent or trivalent alkylene that is interrupted by at least one functional group that is independently carbamate or urea.

In a twentieth embodiment, the present disclosure provides the composition or method of the nineteenth embodiment, and wherein X' is

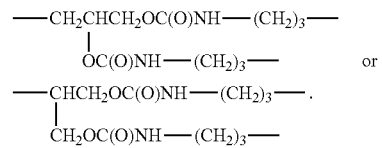

or

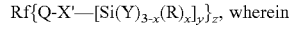

In a twenty-first embodiment, the present disclosure provides the composition or method of any one of the first to twentieth embodiments, wherein the amino-functional compound is a secondary or tertiary amino-functional compound having at least two independently selected silane groups.

In a twenty-second embodiment, the present disclosure provides a composition or method of the twenty-first embodiment, wherein the secondary or tertiary amino-functional compound is represented by formula

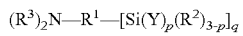

wherein $R^1$ is a multivalent alkylene group optionally interrupted by one or more —O— groups or up to three —NR$^3$— groups;

$R^2$ is alkyl or arylalkylenyl;

each $R^3$ is independently hydrogen, alkyl, arylalkylenyl, or —R$^1$—[Si(Y)$_p$(R$^2$)$_{3-p}$];

Y is alkoxy, acyloxy, aryloxy, polyalkyleneoxy, halogen, or hydroxyl;

p is 1, 2, or 3; and q is 1, 2, or 3, with the provisos that at least two independently selected —Si(Y)$_p$(R$^2$)$_{3-p}$ groups are present and that both $R^3$ groups may not be hydrogen.

In a twenty-third embodiment, the present disclosure provides the composition or method of the twenty-second embodiment, wherein one $R^3$ is alkyl or hydrogen, and the other $R^3$ is —R$^1$—[Si(Y)$_p$(R$^2$)$_{3-p}$].

In a twenty-fourth embodiment, the present disclosure provides the composition or method of any one of the first to twenty-third embodiments, wherein the amino-functional compound is bis(3-trimethoxysilylpropyl)amine, N-methyl-bis(3-trimethoxysilylpropyl)amine, or N,N'-bis[3-trimethoxysilylpropyl]-ethylenediamine.

In a twenty-fifth embodiment, the present disclosure provides the composition or method of any one of the twenty-second to twenty-fourth embodiments, wherein p is 3.

In a twenty-sixth embodiment, the present disclosure provides the composition or method of any one of first to twenty-fifth embodiments, wherein Rf comprises perfluorinated repeating units comprising at least one of —(C$_n$F$_{2n}$O)—, —(CF(Z)O)—, —(CF(Z)C$_n$F$_{2n}$O)—, or —(C$_n$F$_{2n}$CF(Z)O)—; and wherein Z is a perfluoroalkyl group or a perfluoroalkoxy group, each of which is optionally interrupted by at least one ether linkage, and n is an integer from 1 to 12.

In a twenty-seventh embodiment, the present disclosure provides the composition or method of the twenty-sixth embodiment, wherein z is 2, and Rf is —CF$_2$O(CF$_2$O)$_m$(C$_2$F$_4$O)$_b$CF$_2$—, —CF$_2$O(C$_2$F$_4$O)$_b$CF$_2$—, —(CF$_2$)$_3$O(C$_4$F$_8$O)$_b$(CF$_2$)$_3$—, or —CF(CF$_3$)—(OCF$_2$CF(CF$_3$))$_b$O—Rf'—O(CF(CF$_3$)CF$_2$O)$_b$CF(CF$_3$)—, and wherein Rf' is a perfluoroalkylene group optionally interrupted in chain by at least one ether or amine linkage, m is 1 to 50, and b is 3 to 40.

In a twenty-eighth embodiment, the present disclosure provides the composition or method of the twenty-sixth embodiment, wherein Rf is $C_3F_7O(CF(CF_3)CF_2O)_aCF(CF_3)$—, $C_3F_7O(CF_2CF_2CF_2O)_aCF_2CF_2$—, or $CF_3O(C_2F_4O)_aCF_2$—, wherein a has an average value of 3 to 50, and wherein z is 1.

In a twenty-ninth embodiment, the present disclosure provides the composition or method of any one of the first to twenty-seventh embodiments, wherein y is 1 or 2.

In order that this disclosure can be more fully understood, the following examples are set forth. It should be understood that these examples are for illustrative purposes only, and are not to be construed as limiting this disclosure in any manner. All parts and percentages are by weight unless otherwise indicated.

EXAMPLES

Materials

3-Amino-1,2-propanediol, $HOCH_2CH(OH)CH_2NH_2$, (APD); 3-Aminopropyl-trimethoxysilane, $NH_2(CH_2)_3Si(OCH_3)_3$, (APTMS); 3-(triethoxysilyl)propyl isocyanate, $OCN(CH_2)_3Si(OC_2H_5)_3$, (NCO-silane); and tin(II) 2-ethylhexanoate, $[CH_3(CH_2)_3CH(C_2H_5)CO_2]_2Sn$, (TEH) were obtained from Sigma-Aldrich.

Bis(trimethoxysilyl) propyl) amine, $NH[(CH_2)_3Si(OCH_3)_3]_2$, (BTMSPA) was obtained from Momentive.

3-Aminopropyl-triethoxysilane, $NH_2(CH_2)_3Si(OCH_2CH_3)_3$, (APTES) was obtained from Fluka (Sigma-Aldrich Switzerland), Buchs, Switzerland.

$C_4F_9OC_2H_5$ was obtained from 3M Company, St. Paul, Minn., under the trade designation "HFE-7200".

Propyleneglycol n-butylether (PnB) was obtained from Lyondell as Arcosolv® PnB.

Dipropyleneglycol monomethylether (DPM) was obtained from Brenntag.

Dibutoxymethane (DBM) was obtained from Lambiotte & Cie, Marbehan, Belgium.

Tetraethoxy silane (TEOS) was obtained from Sigma-Aldrich.

Preparations

Preparation of HFPO-Oligomer Ester: $CF_3CF_2CF_2O(CF(CF_3)CF_2O)_nCF(CF_3)COOCH_3$ (where n=3 to 20; $MW_{avg}$~1232) can be prepared starting from hexafluoropropylene epoxide and trifluoroacetyl fluoride as given in U.S. Pat. No. 3,250,808 (Example XIII), followed by esterification with methanol as given in U.S. Pat. No. 3,250,808 (Example V).

Preparation of Fluorinated Compound 1 (FC-1): HFPO-Oligomer Ester/APD/NCO-Silane; 1/1/2

A three necked 100 mL round bottom flask fitted with a stirrer, heating mantle, thermometer and condenser, was charged with HFPO-oligomer ester (12.3 g; 0.01 mol) and APD (0.9 g; 0.01 mol). Reaction was done under nitrogen. The temperature of the mixture was elevated to 40° C. and held for 16 hrs. NCO-silane (5.0 g; 0.02 mol) was then added along with one drop of TEH (about 0.05 g) and the resulting mixture was heated overnight at 80° C. The reaction was checked for residual isocyanate using standard IR techniques. The viscous liquid reaction product was dissolved in HFE-7200 to obtain a 10% solids solution.

Preparation of Fluorinated Compound 2 (FC-2): HFPO-Oligomer Ester/APTMS 1/1

Fluorinated compound 2 (FC-2) was prepared essentially according to the method described in U.S. Pat. No. 3,646,085, Example 1, with modifications as outlined below:

A 250 ml polymerization bottle was charged with 178.83 g HFPO-oligomer ester followed by slow addition of 26.85 g 3-aminopropyl trimethoxysilane (APTMS). The polymerization bottle was sealed and run for 16 hours at 75° C. in a preheated Launder-o-meter. The formed methanol was distilled off at 70° C. with a rotary evaporator using waterjet vacuum followed by oil pump vacuum. A clear, semi-viscous colorless liquid was obtained in 98% isolated yield. IR and NMR-spectroscopy confirmed the product structure and completion of the reaction.

Preparation Fluorinated Compound 3 (FC-3): α,ω Perfluoropolyether-Oligomer Diester/APTES ½

Fluorinated compound 3 (FC-3) was prepared from $CH_3OCOCF_2O(CF_2O)_{9-11}(CF_2CF_2O)_{9-11}CF_2COOCH_3$ (number average molecular weight of about 2,000 g/mol, obtained as FOMBLIN Z-DEAL, from Solvay Solexis) and APTES, according to the method as described in U.S. Pat. No. 6,613,860 (Perfluoropolyetherdisilane PFPES-2).

Test Substrates

Stainless steel (SS) test plates (dimensions 12 cm×7 cm), were obtained from Rocholl GmbH, Germany.

Chrome plated ABS plates: obtained from HSO GmbH (Germany) in high roughness (0.9 μm), medium roughness (0.5 μm) and low roughness (0.2 μm).

Prior to use, the test plates were cleaned with a wipe saturated with isopropyl alcohol (IPA) and allowed to dry at room temperature for 5 min.

Application and Curing Procedure

Preparation of treatment compositions: the solvent (or mixture of solvents) was placed in a container. An amount of fluorinated compound and amino functional silane, as indicated in the examples, was added to obtain the required concentration. The compositions were gently mixed to obtain a homogeneous solution. The mixtures were applied to the substrates by wiping or by dip coating:

Wiping Procedure:

0.5 ml of a treatment composition was poured onto a Kim wipe (type 7552/05511) that was then used to wipe the surface of the test plate. The treated test plates were allowed to dry and cure at room temperature for 48 hrs or at 140° C. for 10 min as indicated in the examples.

Dip Coating:

The test plates were immersed horizontally into a bath containing the treatment composition, during 15 seconds. The treated test pieces were allowed to dry and cure horizontally at room temperature for 48 hours or at elevated temperature for 10 min as indicated in the example. Performance evaluation was done 48 hours after drying/curing.

Test Methods

Respective data of tests shown in the following Examples and Comparative Examples are based on the following methods of measurement and evaluation criteria:

Abrasion Method

Abrasion was done 24 hours after application and drying of the treatment compositions. The treated substrates were abraded during 4000 cycles with the yellow side of a water-wet sponge obtained from 3M Company, St. Paul, Minn. under the trade designation "SCOTCHBRITE" using a Scrub Resistance Tester commercially available from Erichsen GmbH & Co. KG, Hemer, Germany. No force was applied.

Contact Angle Measurement

The treated substrates were tested for their static contact angles against water (WCA) and against n-hexadecane (HCA) using a DSA 100 Contact Angle Analyzer (Krüss GmbH). The contact angles were measured before (indicated as 'Initial') and after abrasion ('Abrasion'). Static contact angles against water were measured at least 24 hours after application or after abrasion. The values recorded are the mean values of 3 measurements and are reported in degrees.

Stain Release Evaluation Via Dry Rubbing

In order to measure the stain release properties, stain stripes of 1 cm×5 cm were applied on the treated and untreated test substrates using an Artline Blue permanent marker. The stain repellency was visually rated using a scale of 0 to 5, wherein 0 means that the marker paint drops fully bead up and 5 means that the marker paint wets the surface completely.

After application of the stain, the test substrate was dried for 30 minutes at room temperature after which ease of stain removal and stain resistance was evaluated:

a. Ease of Stain Removal

The ease of stain removal was evaluated by rubbing the stained surface for 20 seconds with a dry cotton cloth. The stain removal was rated on a scale from 1 to 3 wherein 1 means "easy removal", 2: medium removal and 3: difficult removal.

b. Stain Resistance

After the stain was removed by rubbing for 20 seconds with a dry cotton cloth (ease of stain removal test), the residual stain was visually rated using a number between 1 and 8, where 1 means "completely stained" and 8 refers to "no stain left".

Fingerprint Release Test

The fingerprint release test was done according to BMW PR 506 test method.

a. Preparation of 'synthetic Finger Fat'

Synthetic 'finger fat' was prepared by mixing:
50 g alkaline 'synthetic sweat' prepared according to DIN EN ISO 105-E04 and comprising per 100 ml:
  0.5 g Sodium chloride
  1.5 g Disodium hydrogen phosphate-12-hydrate
  0.05 g L-Histidin-monohydrochloride-1-hydrate
A solution of 0.1 mole/l sodium hydroxide was added to adjust the pH to 8±2.
2 g Paraffin oil
1.5 g Lecithin (Fluidlecithin Super), obtained from Brennessel, München
0.3 g PNC 400 thickener, obtained from Brennessel, München b. Fingerprint Release Test Procedure The fingerprint release test was done according to a slightly modified version of test method BMW PR 506:
1.4 ml synthetic finger fat was applied onto a 4 cm×4 cm "Glorex Bastelfilz weiß" felt piece (100% acrylic art. 6.1212.611, obtained from OBI, Germany) and spread with a wooden spatula. After 2 to 4 minutes a silicone rubber stamp—with a thumb profile—was pressed onto the felt piece with a force of 30 N for 5 seconds. Then the silicone stamp was pressed onto the treated and untreated SS test substrate using a force of 30 N for 5 seconds. The samples were allowed to dry at room temperature for 24 hours before evaluation.

The fingerprint markings (fingerprint resistance) were rated according to the following scale:

| Rating | Observation |
| --- | --- |
| 9-10 | No change of the substrate |
| 8 | Minimal fingerprint visible |
| 7 | Light fingerprint |
| 6 | Clear fingerprint marking |
| 5 | Strong fingerprint marking |

Fingerprint removal test was done by wiping 1 time with a dry Kim wipe (type 7552/055111), followed by wiping for 10 seconds with a fresh dry Kim wipe (type 7552/055111). The following scale was used for rating the fingerprint residues (fingerprint removal).

| Rating | Observation |
| --- | --- |
| 9-10 | Complete removal; no visible residue |
| 8 | Minimal residual fingerprint |
| 7 | Light residual fingerprint |
| 6 | Clear residual fingerprint |
| 5 | No fingerprint removal |

Sunscreen Release Test

Sunscreen release was tested according to Porsche Procedure PTL 4025. About 0.32 to 0.40 g "Nivea Sun 30" sunscreen (Beiersdorf Germany) was applied on a 4 cm×4 cm cotton piece and spread with a wooden spatula. The cotton piece was placed on a stainless steel test plate such that the sunscreen was in contact with the test plate and allowed to dry at 80° C. for 24 hrs. After removal of the cotton piece the sunscreen markings (sunscreen resistance) and sunscreen residues (ease of sunscreen removal) were rated according to the same scales as for the finger print release test described above.

Examples Ex-1 to Ex-3 and Reference Examples REF-1 to REF-4

The treatment composition for example Ex-1, containing a mixture of fluorinated compound 1 (FC-1) and amino functional silane (BTMSPA) was prepared by placing 98.9 parts HFE-7200 in ajar. 1 part of a 10% solution of FC-1 in HFE-7200 (representing 0.1% solids fluorinated compound 1) and 0.1 part of BTMSPA were added. Treatment compositions for examples Ex-2 and Ex-3 were prepared in the same way by placing 99.8 parts HFE-7200 in ajar. 0.1 part fluorinated compounds FC-2 or FC-3 (as indicated in Table 1) and 0.1 part BTMSPA were added. In all examples, the mixtures were gently mixed to obtain a clear (Ex-1 and Ex-2) or slightly hazy (Ex-3) ready-to-use treatment containing 0.2% solids (fluorinated compound and amino functional silane).

Treatment compositions of Reference Examples REF-2 to REF-4, containing fluorinated compounds FC-1 to FC-3 respectively, were prepared the same way as the treatment composition of example 1, but without the addition of amino functional silane.

The treatment compositions for Ex-1 to Ex-3 and Reference Examples REF-2 to REF-4 were applied onto cleaned stainless steel plates by wiping. The treated test plates were allowed to dry at room temperature for 48 hours or alternatively at 140° C. for 10 min.

Reference example REF-1 was made with an uncoated cleaned stainless steel plate.

TABLE 1

Treatment compositions used in Examples Ex-1 to Ex-3 and Reference Examples REF-2 to REF-4 (amounts in % by weight)

|  | FS-1 | FS-2 | FS-3 | BTMSPA | HFE-7200 |
| --- | --- | --- | --- | --- | --- |
| Ex-1 | 0.1 | / | / | 0.1 | 99.8 |
| Ex-2 | / | 0.1 | / | 0.1 | 99.8 |
| Ex-3 | / | / | 0.1 | 0.1 | 99.8 |
| REF-2 | 0.1 | / | / | / | 99.9 |

TABLE 1-continued

Treatment compositions used in Examples Ex-1 to Ex-3 and Reference Examples REF-2 to REF-4 (amounts in % by weight)

| | FS-1 | FS-2 | FS-3 | BTMSPA | HFE-7200 |
|---|---|---|---|---|---|
| REF-3 | / | 0.1 | / | / | 99.9 |
| REF-4 | / | / | 0.1 | / | 99.9 |

The performance of the treated test plates was evaluated 24 hours after drying/curing. Static contact angles against water (WCA) as well as stain release properties versus an Artline blue permanent marker and fingerprint release properties were measured according to the methods described above. The properties of the treated test substrates after drying/curing at room temperature during 8 hours, and without abrasion, are listed in Table 2.

TABLE 2

Properties of treated and untreated stainless steel substrates (RT cure)

| EX | WCA (°) | Stain release (Artline blue permanent marker) | | Fingerprint release | |
|---|---|---|---|---|---|
| | | Ease stain removal | Stain resistance | Fingerprint markings | Fingerprint Residues |
| Ex-1 | 90 | 1 | 8 | 5 | 9 |
| Ex-2 | 115 | 1 | 8 | 6 | 9 |
| Ex-3 | 109 | 1 | 8 | 7 | 9 |
| REF-1 | 51 | 3 | 2 | 5 | 6 |
| REF-2 | 63 | 3 | 3 | 5 | 7 |
| REF-3 | 54 | 3 | 3 | 5 | 7 |
| REF-4 | 110 | 3 | 4 | 6 | 7 |

Stainless steel plates treated with the treatment composition from examples Ex-2 and Ex-3 were also evaluated after curing at 140° C. for 10 min. The static contact angles against water (WCA) as well as the stain release versus an Artline blue permanent marker and fingerprint release were measured initial ('Initial') and after 4000 cycle abrasion ('Abrasion'), according to the methods described above. The results are given in Table 3.

TABLE 3 properties of treated and untreated stainless steel substrates (cure at 140° C.)

| | WCA (°) | | Stain release (Artline blue permanent marker) | | | | Fingerprint release | | | |
|---|---|---|---|---|---|---|---|---|---|---|
| | | | Initial | | Abrasion | | Initial | | Abrasion | |
| | Initial | Abrasion | Ease stain removal | Stain resistance | Ease stain removal | Stain resistance | Fingerprint markings | Fingerprint residues | Fingerprint markings | Fingerprint residues |
| Ref-1 | 51 | 51 | 3 | 2 | 3 | 2 | 5 | 6 | 5 | 6 |
| Ex-1 | 103 | 95 | 1 | 8 | 1 | 8 | 5 | 8 | 5 | 9 |
| Ex-3 | 106 | 101 | 1 | 8 | 1 | 8 | 6 | 9 | 5 | 9 |

Examples Ex-4 to Ex-6, and Reference Examples REF-5 to REF-7

Treatment compositions used in examples Ex-4 to Ex-6, and References REF-5 to REF-7 (composition as listed in Table 4), were made according to the general procedure described above for examples Ex-1 to Ex-3 and REF-2 to REF-4. The ready-to use treatment compositions of examples Ex-4 to Ex 6 contained 0.1% solids (fluorinated compound and amino functional silane).

TABLE 4

Treatment compositions used in Examples Ex-4 to Ex-6 and Reference Examples REF-5 to REF-7 (amounts in % by weight)

| | FC-1 | FC-2 | FC-3 | BTMSPA | HFE-7200 |
|---|---|---|---|---|---|
| Ex-4 | 0.05 | / | / | 0.05 | 99.9 |
| Ex-5 | / | 0.05 | / | 0.05 | 99.9 |
| Ex-6 | / | / | 0.05 | 0.05 | 99.9 |
| REF-5 | 0.05 | / | / | / | 99.95 |
| REF-6 | / | 0.05 | / | / | 99.95 |
| REF-7 | / | / | 0.05 | / | 99.95 |

Cleaned stainless steel plates were treated with the compositions of examples Ex-4 to Ex-6 and reference examples REF-5 to REF-7 by dip coat application. Therefore, the cleaned stainless steel plates were immersed horizontally into a bath containing the treatment composition during 15 seconds. After removal from the treatment bath, the substrates were allowed to dry and cure horizontally at room temperature for 48 hours before performance evaluation. The static contact angles against water (WCA) as well as the stain release versus an Artline blue permanent marker were measured according to the methods described above. The results are given in Table 5.

TABLE 5 properties of treated stainless steel substrates (RT cure)

| | WCA (°) | Stain release (Artline blue permanent marker) | |
|---|---|---|---|
| | | Ease stain removal | Stain resistance |
| Ex-4 | 90 | 1 | 8 |
| Ex-5 | 115 | 1 | 8 |
| Ex-6 | 109 | 1 | 8 |
| REF-5 | 51 | 3 | 3 |
| REF-6 | 63 | 3 | 3 |
| REF-7 | 54 | 3 | 4 |

Stainless steel plates treated with the treatment composition from examples Ex-6 and Ex-6 were also evaluated after curing at 140° C. for 10 min. The static contact angles against water (WCA) as well as the stain release versus an Artline blue permanent marker and fingerprint release were measured initial ('Initial') and after 4000 cycle abrasion ('Abrasion'), according to the methods described above. The results are given in Table 6.

TABLE 6 properties of treated stainless steel substrates; 140° C. cure

| | WCA (°) | | Stain release (Artline blue permanent marker) | | | | Fingerprint release | | | |
| | | | Initial | | Abrasion | | Initial | | Abrasion | |
| | Initial | Abrasion | Ease stain removal | Stain resistance | Ease stain removal | Stain resistance | Fingerprint markings | Fingerprint residues | Fingerprint markings | Fingerprint residues |
|---|---|---|---|---|---|---|---|---|---|---|
| Ex-4 | 102 | 99 | 1 | 8 | 1 | 8 | 5 | 9 | 5 | 9 |
| Ex-6 | 107 | 106 | 1 | 8 | 1 | 8 | 6 | 9 | 6 | 9 |

Example Ex-7

The treatment composition used in example Ex-7 was made according to the procedure described above for Ex-3. The composition contained 0.2% by weight FS-3, 0.1% by weight BTMSPA and 99.7% by weight HFE-7200. Cleaned chrome plated ABS test plates having various surface roughness were treated with by wipe application according to the general procedure outlined above. The treated substrates were allowed to dry/cure at room temperature during 48 hours. Reference example REF-8 refers to an untreated chrome plated ABS test plate. Static contact angles against water (WCA) as well as stain release versus an Artline blue permanent marker and fingerprint release were measured according to the methods described above. No abrasion was applied. The results are given in Tables 7 and 8.

TABLE 7

Stain release (Artline Blue permanent marker) of treated and untreated chrome plated ABS test plates

| | Chrome plated ABS medium roughness (0.5 μm) | | Chrome plated ABS low roughness (0.2 μm) | | Chrome plated ABS high roughness (0.9 μm) | |
| | Ease of stain removal | Stain resistance | Ease of stain removal | Stain resistance | Ease of stain removal | Stain resistance |
|---|---|---|---|---|---|---|
| Ex-7 | 2 | 7 | 1 | 8 | 1 | 8 |
| REF-8 | 3 | 2 | 3 | 2 | 3 | 2 |

TABLE 8

Fingerprint release of treated and untreated chrome plated ABS test plates

| | Chrome plated ABS medium roughness (0.5 μm) | | Chrome plated ABS low roughness (0.2 μm) | | Chrome plated ABS high roughness (0.9 μm) | |
| | Fingerprint markings | Fingerprint residues | Fingerprint markings | Fingerprint residues | Fingerprint markings | Fingerprint residues |
|---|---|---|---|---|---|---|
| Ex-7 | 7 | 8 | 6 | 9 | 7 | 9 |
| REF-8 | 5 | 5 | 6 | 6 | 6 | 6 |

Examples Ex-8 and Ex-9

Examples Ex-8 and Ex-9 were made with the treatment compositions used in examples Ex-4 and Ex-6 respectively. Cleaned chrome plated ABS plates were treated with the treatment compositions also used in examples Ex-4 and Ex-6 by dip coat application according to the general procedure outlined above. After removal from the treatment bath, the treated substrates were allowed to dry and cure horizontally at room temperature for 48 hours. In an alternative experiment the treated substrates were cured at 140° C. during 10 min after removal from the treatment bath. In any case, a homogeneous treatment was obtained without any noticeable visual or haptic change to the surface of the substrates. Fingerprint release and sunscreen release were measured according to the methods described above. No abrasion was applied. The performance results are listed in Table 9.

TABLE 9

Release properties of chrome plated ABS plates treated by dip application

| | | Fingerprint release | | Sunscreen release | |
|---|---|---|---|---|---|
| | Cure | Finger-print markings | Finger-print residues | Sun-screen markings | Sun-screen residues |
| Chrome plated ABS - Low roughness (0.2 μm) | | | | | |
| Ex-8 | 48 hrs RT | 6 | 9 | 7 | 9 |
| | 10 min 140° C. | 6 | 9 | 7 | 9 |
| Ex-9 | 48 hrs RT | 6 | 9 | 8 | 9 |
| | 10 min 140° C. | 6 | 9 | 8 | 9 |
| Chrome plated ABS - medium roughness (0.5 μm) | | | | | |
| Ex-8 | 48 hrs RT | 6 | 8 | 6 | 8 |
| | 10 min 140° C. | 6 | 9 | 7 | 9 |
| Ex-9 | 48 hrs RT | 6 | 9 | 8 | 7 |
| | 10 min 140° C. | 7 | 9 | 8 | 8 |
| Chrome plated ABS - High roughness (0.9 μm) | | | | | |
| Ex-8 | 48 hrs RT | 6 | 9 | 7 | 9 |
| | 10 min 140° C. | 6 | 9 | 7 | 9 |
| Ex-9 | 48 hrs RT | 7 | 9 | 8 | 9 |
| | 10 min 140° C. | 7 | 9 | 7 | 9 |

Examples Ex-10 and Ex-11 and Reference Examples REF-9 and REF-10

The treatment compositions used in examples Ex-10 and Ex-11, were prepared by placing 49.95 parts HFE-7200 and 49.95 parts PnB (Ex-10) or 49.95 parts HFE-7200 and 49.95 parts DPM (Ex-11) in a jar. 0.05 parts FC-3 and 0.05 parts BTMSPA were added. The mixtures were gently mixed to obtain a clear ready-to-use treatment composition containing 0.1% solids (fluorinated compound and amino-functional silane). The compositions used in Reference examples REF-9 and REF-10 were made in the same way, but without addition of amino-functional silane (BTMSPA). The treatment compositions are listed in Table 10.

TABLE 10

Treatment compositions used in Examples Ex-10 and Ex-11 and Reference Examples REF-9 and REF-10 (amounts in % by weight)

| | FC-3 | BTMSPA | HFE-7200 | PnB | DPM |
|---|---|---|---|---|---|
| Ex-10 | 0.05 | 0.05 | 49.95 | 49.95 | / |
| Ex-11 | 0.05 | 0.05 | 49.95 | / | 49.95 |
| REF-9 | 0.05 | / | 49.98 | 49.98 | / |
| REF-10 | 0.05 | / | 49.98 | 0.1 | 49.98 |

Cleaned stainless steel plates were treated with the treatment compositions from Table 10 by wiping according to the general procedure outlined above. The treated test plates were allowed to dry at room temperature for 48 hrs before performance testing.

Static contact angles against water (WCA) as well as the stain release versus an Artline blue permanent marker were measured initially ('initial') and after 4000 cycle abrasion ('Abrasion'), according to the methods described above. The results are given in Table 11.

TABLE 11

Properties of treated stainless steel

| | WCA (°) | | Stain release (Artline Blue permanent marker) | | | |
|---|---|---|---|---|---|---|
| | | | Initial | | Abrasion | |
| | Initial | Abrasion | Ease stain removal | Stain resis-tance | Ease stain removal | Stain resis-tance |
| Ex-10 | 111 | 91 | 1 | 8 | 3 | 6 |
| Ex-11 | 107 | 95 | 1 | 8 | 3 | 8 |
| REF-9 | 110 | 75 | 3 | 3 | 3 | 1 |
| REF-10 | 108 | 73 | 3 | 4 | 3 | 1 |

Examples Ex-12 to Ex-17

Treatment compositions used in examples Ex-12 to Ex-17 are listed in Table 12. The treatment composition used in Ex-12 was made by placing 99.45 DPM in ajar, 0.5 parts of a 10% solution of FC-1 in HFE-7200 (representing 0.05 parts FC-1 and 0.45 parts HFE-7200) were added as well as 0.05 parts BTMSPA. The treatment compositions used in examples Ex-13 and Ex-16 were made in the same way but with respectively PnB and DBM instead of DPM. The treatment composition of example Ex-14 was prepared by placing 99.5 parts DPM in ajar and adding 0.05 parts FC-2 and 0.05 parts BTMSPA. The treatment compositions used in examples Ex-15 and Ex-17 were made in the same way but with respectively PnB and DBM instead of DPM. All mixtures were gently mixed to obtain clear ready-to-use treatment formulation containing 0.1% solids (fluorinated compound and amino-functional silane).

TABLE 12

Treatment compositions used in examples Ex-12 to Ex-17 (amounts in % by weight)

| | FC-1 | HFE-7200 | FC-2 | BTMSPA | DPM | PnB | DBM |
|---|---|---|---|---|---|---|---|
| Ex 12 | 0.05 | 0.45 | / | 0.05 | 99.45 | / | / |
| Ex 13 | 0.05 | 0.45 | / | 0.05 | / | 99.45 | / |
| Ex 14 | / | / | 0.05 | 0.05 | 99.50 | / | / |
| Ex 15 | / | / | 0.05 | 0.05 | / | 99.50 | / |
| Ex 16 | 0.05 | 0.45 | / | 0.05 | / | / | 99.45 |
| Ex 17 | / | / | 0.05 | 0.05 | / | / | 99.50 |

Cleaned stainless steel test substrates were treated with the treatment compositions by dip coating according to the general procedure outlined above. The treated test plates were allowed to dry at room temperature for 48 hrs before performance evaluation.

Static contact angles against water (WCA) and n-hexadecane (HCA) as well as stain release properties versus an Artline blue permanent marker were measured initially ('Initial') and after 4000 cycles abrasion ('Abrasion') according to the methods described above. The results are listed in Table 13.

TABLE 13

Properties of treated stainless steel

| | Static contact angle | | | | Stain release | | | | | |
|---|---|---|---|---|---|---|---|---|---|---|
| | Initial | | Abrasion | | Initial | | | Abrasion | | |
| Ex | WCA (°) | HCA (°) | WCA (°) | HCA (°) | repellency | Ease of removal | resistance | Repellency | Ease of removal | resistance |
| Ex-12 | 102 | 71 | 84 | 52 | 1 | 1 | 8 | 1 | 1 | 8 |
| Ex-13 | 97 | 69 | 87 | 51 | 1 | 1 | 8 | 2 | 2 | 8 |
| Ex-14 | 107 | 65 | 97 | 60 | 1 | 1 | 8 | 1 | 2 | 8 |
| Ex-15 | 110 | 66 | 88 | 54 | 1 | 1 | 8 | 1 | 2 | 8 |
| Ex-16 | 99 | 67 | 102 | 61 | 1 | 1 | 8 | 1 | 1 | 8 |
| Ex-17 | 106 | 59 | 100 | 60 | 1 | 2 | 8 | 1 | 2 | 8 |

Examples Ex-18 to Ex-23, Reference Examples REF-11 and REF-12, Illustrative Examples, I-1 to I-4, and Comparative Examples C-1 to C-2

Treatment compositions used in examples Ex-18 and Ex-19 were made of blends of fluorinated compound FC-3 with amino-functional silanes (BTMSPA or APTES) in PnB. The total amount of solids was 0.06% solids. Treatment compositions used in examples Ex-20 and Ex-21 were made in the same way, but having 0.1% solids. The treatment compositions of Illustrative Examples I-1 to I-4 were prepared in the same way but contained 0.2% solids (I-1 and I-2) or 0.4% solids (1-3 and I-4) as indicated in Table 14. The compositions were prepared according to the general procedure outlined above. The treatment compositions of Reference Examples REF-11 and REF-12 were made with fluorinated compound FC-3, but without amino-functional silane. The treatment compositions of Comparative Examples C-1 and C-2 were made with a mixture of fluorinated compound FC-3 and an alkoxysilane instead of an amino-functional silane. The mixtures were gently mixed to obtain ready-to-use treatment formulations having a solids content as indicated in Table 14. All mixtures were hazy.

TABLE 14

Treatment compositions used in examples Ex-18 to Ex-21, Reference Examples REF-11 and REF-12, Illustrative Examples I-1 to I-4, and Comparative Examples C-1 and C-2

| | PRIMER | TREATMENT COMPOSITION | | | | | |
|---|---|---|---|---|---|---|---|
| | BTMSPA | FC-3 | BTMSPA | APTES | TEOS | PnB | % solids |
| Ex 18 | / | 0.03 | 0.03 | / | / | 99.94 | 0.06 |
| Ex 19 | / | 0.03 | / | 0.03 | / | 99.94 | 0.06 |
| Ex-20 | / | 0.05 | 0.05 | / | / | 99.90 | 0.10 |
| Ex-21 | / | 0.05 | / | 0.05 | / | 99.90 | 0.10 |
| Ex-22 | 0.03 | 0.03 | / | / | / | 99.97 | 0.06 |
| Ex-23 | 0.05 | 0.05 | / | / | / | 99.95 | 0.10 |
| I-1 | / | 0.20 | 0.20 | / | / | 99.60 | 0.40 |
| I-2 | / | 0.20 | / | 0.20 | / | 99.60 | 0.40 |

TABLE 14-continued

Treatment compositions used in examples Ex-18 to Ex-21,
Reference Examples REF-11 and REF-12, Illustrative Examples
I-1 to I-4, and Comparative Examples C-1 and C-2

| | PRIMER | TREATMENT COMPOSITION | | | | | |
|---|---|---|---|---|---|---|---|
| | BTMSPA | FC-3 | BTMSPA | APTES | TEOS | PnB | % solids |
| I-3 | / | 0.40 | 0.40 | / | / | 99.20 | 0.80 |
| I-4 | / | 0.40 | / | 0.40 | / | 99.20 | 0.80 |
| REF-11 | / | 0.03 | / | / | / | 99.97 | 0.03 |
| REF-12 | / | 0.05 | / | / | / | 99.95 | 0.05 |
| C-1 | / | 0.03 | / | / | 0.03 | 99.94 | 0.06 |
| C-2 | / | 0.05 | / | / | 0.05 | 99.90 | 0.10 |

Cleaned stainless steel test substrates were treated with the treatment compositions listed in Table 14 by dip coating according to the general procedure outlined above. The treated test plates were cured at 85° C. for 10 min.

For examples Ex-22 and Ex-23, cleaned stainless steel test substrates were dip coated first in a PnB solution containing respectively 0.03% and 0.05% BTMSPA primer, followed by curing at 85° C. for 10 minutes. After cooling to room temperature the test substrates were dip coated with the coating treatment compositions listed for Ex-22 and Ex-23 in Table 14. The treated test plates were cured at 85° C. for 10 minutes.

The stainless steel substrates treated with illustrative examples I-1 to I-4 had a very irregular surface appearance. These treated substrates were not further tested for their performance.

On all other treated substrates, stain release versus an Artline blue permanent marker was measured initially ('Initial') and after 4000 cycles abrasion ('Abrasion') according to the methods described above. The results are given in Table 15.

TABLE 15

Stain release performance of treated substrates

| | Stain release versus Artline blue permanent marker | | | | | |
|---|---|---|---|---|---|---|
| | Initial | | | Abrasion | | |
| | Stain Repellency | Ease stain removal | Stain resistance | Stain Repellency | Ease stain removal | Stain resistance |
| Ex-18 | 1 | 1 | 7 | 1 | 2 | 8 |
| Ex-19 | 2 | 3 | 7 | 4 | 3 | 4 |
| Ex-20 | 1 | 1 | 8 | 2 | 2 | 8 |
| Ex-21 | 1 | 2 | 8 | 5 | 3 | 4 |
| Ex-22 | 1 | 1 | 8 | 1 | 2 | 8 |
| Ex-23 | 1 | 1 | 8 | 2 | 1 | 8 |
| REF-11 | 1 | 1 | 4 | 4 | 3 | 4 |
| REF-12 | 1 | 2 | 4 | 4 | 3 | 4 |
| C-1 | 1 | 2 | 7 | 5 | 2 | 3 |
| C-2 | 1 | 2 | 8 | 5 | 3 | 3 |

The complete disclosures of the patents, patent documents and publications cited herein are incorporated by reference in their entirety as if each were individually incorporated. In case of conflict, the present specification, including definitions, shall control. Various modifications and alterations to this invention will become apparent to those skilled in the art without departing from the scope and spirit of this invention. Illustrative embodiments and examples are provided as examples only and are not intended to limit the scope of the present invention. The scope of the invention is limited only by the claims set forth as follows.

What is claimed is:

1. A composition comprising;
an amino-functional compound having at least one silane group;
a fluorinated compound represented by formula:

$$Rf\{-X-[Si(Y)_{3-x}(R)_x]_y\}_z$$

wherein:
Rf is a polyfluoropolyether group;
X is a divalent or trivalent organic linking group;
each Y is independently halogen, alkoxy, hydroxyl, acyloxy, polyalkyleneoxy, or aryloxy;
R is an alkyl group having up to 8 carbon atoms or a phenyl group;
x is 0 or 1 or 2;
y is a value from 1 to 8; and
z is 1 or 2; and
a non-fluorinated organic solvent having a flashpoint of at least 40° C.,
wherein the composition comprises up to one percent by weight of an organic solvent having a flashpoint up to 40° C. and up to five percent by weight of an hydrofluoroether having a flashpoint of at least 40° C.

2. A composition comprising;
an amino-functional compound having at least one silane group;
a fluorinated compound represented by formula:

$$Rf\{-X-[Si(Y)_{3-x}(R)_x]_y\}_z$$

wherein:
Rf is a polyfluoropolyether group;
X is a divalent or trivalent organic linking group;
each Y is independently halogen, alkoxy, hydroxyl, acyloxy, polyalkyleneoxy, or aryloxy;
R is an alkyl group having up to 8 carbon atoms or a phenyl group;
x is 0 or 1 or 2;
y is a value from 1 to 8; and
z is 1 or 2; and
a non-fluorinated organic solvent having a flashpoint of at least 40° C.,
wherein the composition comprises up to one percent by weight of an organic solvent having a flashpoint up to 40° C., and wherein the fluorinated compound is present in the composition in an amount up to 0.4 percent by weight, based on the total weight of the composition.

3. The composition of claim 2, wherein the fluorinated compound is represented by formula $$Rf\{Q-X'-[Si(Y)_{3-x}(R)_x]_y\}_z, \text{ wherein}$$

Q is a bond, —C(O)—N(R')—, —C(O)—O—, or —SO$_2$N(R')—, wherein R' is hydrogen or alkyl having up to 4 carbon atoms; and X' is a divalent or trivalent organic linking group comprising at least one of alkylene or arylalkylene, each of which is optionally interrupted by at least one functional group that is independently ether, thioether, sulfone, amine, ester, amide, carbamate, or urea.

4. The composition of claim 3, wherein Q is —C(O)—N(R')—, and X' is divalent or trivalent alkylene that is optionally interrupted by at least one functional group that is independently ether, ester, carbamate, or urea.

5. The composition of claim 1, wherein the amino-functional compound is a secondary or tertiary amino-functional compound having at least two independently selected silane groups.

6. The composition of claim 5, wherein the secondary or tertiary amino-functional compound is represented by formula $$(R^3)_2N—R^1—[Si(Y)_p(R^2)_{3-p}]_q$$

wherein
R$^1$ is a multivalent alkylene group optionally interrupted by one or more —O— groups or up to three —NR$^3$— groups;
R$^2$ is alkyl or arylalkylenyl;
each R$^3$ is independently hydrogen, alkyl, arylalkylenyl, or —R$^1$—[Si(Y)$_p$(R$^2$)$_{3-p}$];
Y is alkoxy, acyloxy, aryloxy, polyalkyleneoxy, halogen, or hydroxyl;
p is 1, 2, or 3; and
q is 1, 2, or 3,
with the provisos that at least two independently selected —Si(Y)$_p$(R$^2$)$_{3-p}$ groups are present and that both R$^3$ groups may not be hydrogen.

7. The composition of claim 6, wherein one R$^3$ is alkyl or hydrogen, and the other R$^3$ is —R$^1$—[Si(Y)$_p$(R$^2$)$_{3-p}$].

8. The composition of claim 1, wherein Rf comprises perfluorinated repeating units comprising at least one of —(C$_n$F$_{2n}$O)—, —(CF(Z)O)—, —(CF(Z)C$_n$F$_{2n}$O)—, or —(C$_n$F$_{2n}$CF(Z)O)—; and wherein Z is a perfluoroalkyl group or a perfluoroalkoxy group, each of which is optionally interrupted by at least one ether linkage, and n is an integer from 1 to 12.

9. The composition of claim 8, wherein z is 2, and Rf is —CF$_2$O(CF$_2$O)$_m$(C$_2$F$_4$O)$_b$CF$_2$—, —CF$_2$O(C$_2$F$_4$O)$_b$CF$_2$—, —(CF$_2$)$_3$O(C$_4$F$_8$O)$_b$(CF$_2$)$_3$—, or —CF(CF$_3$)—(OCF$_2$CF(CF$_3$))$_b$O—Rf'—O(CF(CF$_3$)CF$_2$O)$_b$CF(CF$_3$)—, and wherein Rf' is a perfluoroalkylene group optionally interrupted by at least one ether or amine linkage, m is 1 to 50, and b is 3 to 40.

10. The composition of claim 1, wherein Rf is C$_3$F$_7$O(CF(CF$_3$)CF$_2$O)$_a$CF(CF$_3$)—, C$_3$F$_7$O(CF$_2$CF$_2$CF$_2$O)$_a$CF$_2$CF$_2$—, or CF$_3$O(C$_2$F$_4$O)$_a$CF$_2$—, wherein "a" has an average value of 3 to 50, and wherein z is 1.

11. The composition of claim 2, further comprising a hydrofluoroether having a flashpoint of at least 40° C.

12. The composition of claim 1, wherein the composition is essentially free of an acid catalyst.

13. A method of making a treated article having a metal surface, the method comprising treating the metal surface with the composition of claim 1.

14. A method of making a treated article having a metal surface, the method comprising treating the metal surface with the composition of claim 2.

15. The method of claim 13, wherein the metal surface comprises at least one of chromium, chromium alloys, iron, aluminum, copper, nickel, zinc, tin, stainless steel, or brass.

16. The composition of claim 3, wherein X' is

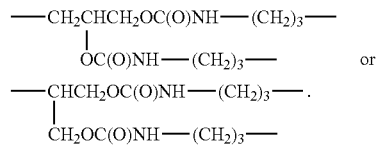

17. The composition of claim 1, wherein the amino-functional compound is bis(3-trimethoxysilylpropyl)amine, N-methyl-bis(3-trimethoxysilylpropyl)amine, or N,N'-bis[3-trimethoxysilylpropyl]-ethylenediamine.

18. The composition of claim 1, wherein y is 1 or 2.

19. The composition of claim 1, wherein the amino-functional compound is present in the composition in a range from 0.01 percent to 2 percent by weight, based on the total weight of the composition.

20. The composition of claim 1, wherein the fluorinated compound is present in the composition in an amount less than 0.4 percent by weight, based on the total weight of the composition.

* * * * *

UNITED STATES PATENT AND TRADEMARK OFFICE
CERTIFICATE OF CORRECTION

PATENT NO. : 10,858,540 B2  
APPLICATION NO. : 15/762350  
DATED : December 8, 2020  
INVENTOR(S) : Frans Audenaert Page 1 of 1

It is certified that error appears in the above-identified patent and that said Letters Patent is hereby corrected as shown below:

In the Specification

Column 8  
Line 3, delete "$O)_q'$—" and insert -- $O)_q''$— --, therefor.  
Line 5, delete "$O)_q'$—" and insert -- $O)_q''$— --, therefor.

Column 9  
Line 42, delete "$(CH_2H_3)_3$" and insert -- $CH_2CH_3)_3$ --, therefor.

Column 11  
Line 46, delete "(Z)," and insert -- $(Z)_x$, --, therefor.

Column 17  
Line 29, delete "$(R)]_y\}_z$," and insert -- $(R)_x]_y\}_z$, --, therefor.

Column 27  
Line 35, delete "Histidin-" and insert -- Histidine- --, therefor.

Column 28  
Line 34, delete "ajar." and insert -- a jar. --, therefor.  
Line 38, delete "ajar." and insert -- a jar. --, therefor.

Column 34  
Line 41, delete "ajar," and insert -- a jar, --, therefor.  
Line 48, delete "ajar" and insert -- a jar --, therefor.

Column 35  
Line 40, delete "(1-3" and insert -- (I-3 --, therefor.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*